(12) United States Patent
Zhou et al.

(10) Patent No.: US 9,285,799 B2
(45) Date of Patent: Mar. 15, 2016

(54) METHODS AND APPARATUS TO DYNAMICALLY DISPLAY DATA ASSOCIATED WITH A PROCESS CONTROL SYSTEM

(75) Inventors: Ling Zhou, Austin, TX (US); James Henry Moore, Jr., Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 430 days.

(21) Appl. No.: 12/623,502

(22) Filed: Nov. 23, 2009

(65) Prior Publication Data
US 2011/0126142 A1    May 26, 2011

(51) Int. Cl.
*G05B 19/418*    (2006.01)

(52) U.S. Cl.
CPC .. *G05B 19/4183* (2013.01); *G05B 2219/31467* (2013.01); *G05B 2219/31472* (2013.01)

(58) Field of Classification Search
CPC ...................... G06F 17/30244–17/3028; G06F 17/30864–17/3087; G06F 17/30386; G06F 17/30554; G06F 15/173; G06F 3/0484; G06F 3/0482; G06F 3/0481; G06F 3/048; G06F 3/0488; G06F 3/04842; G06F 8/34; G06F 8/38; G06F 9/4443; G05B 2219/31472; G05B 2219/32128; G05B 2219/23258; G05B 2219/25067; G05B 2219/31469; G05B 2219/32235; G05B 23/0267
USPC .................................................. 715/771–772
See application file for complete search history.

(56) References Cited

U.S. PATENT DOCUMENTS

| 4,967,381 | A | | 10/1990 | Lane et al. |
| 5,339,392 | A | | 8/1994 | Risberg et al. |
| 5,576,946 | A | * | 11/1996 | Bender et al. ................... 700/17 |
| 5,842,205 | A | * | 11/1998 | Brann |
| 5,897,661 | A | | 4/1999 | Baranovsky et al. |
| 6,282,548 | B1 | | 8/2001 | Burner et al. |
| 6,308,168 | B1 | | 10/2001 | Dovich et al. |
| 6,621,505 | B1 | | 9/2003 | Beauchamp et al. |
| 6,760,721 | B1 | | 7/2004 | Chasen et al. |

(Continued)

FOREIGN PATENT DOCUMENTS

| CN | 101464685 A | 6/2009 |
| EP | 1770463 | 4/2007 |

(Continued)

OTHER PUBLICATIONS

Search Report under Section 17(5), issued by the British Intellectual Property Office, in connection with British Application No. GB1019075.9, on Apr. 4, 2011, 4 pages.

(Continued)

*Primary Examiner* — Claudia Dragoescu
(74) *Attorney, Agent, or Firm* — Hanley, Flight & Zimmerman, LLC

(57) ABSTRACT

Example methods and apparatus to dynamically display data associated with a process control system are disclosed. A disclosed example method includes receiving in a graphics engine, process control information selected by a user, identifying process data associated with the selected process control information, retrieving the identified process data from a process controller, determining metadata associated with the retrieved process data, generating in the graphics engine a data representation based on the metadata, and displaying the data representation via a user interface.

40 Claims, 14 Drawing Sheets

(56) References Cited

U.S. PATENT DOCUMENTS

| | | | |
|---|---|---|---|
| 7,925,611 B1* | 4/2011 | Bromley et al. | 706/60 |
| 8,555,206 B2 | 10/2013 | Pederson et al. | |
| 2004/0158713 A1* | 8/2004 | Aneweer et al. | 713/166 |
| 2005/0057566 A1* | 3/2005 | Githens et al. | 345/440 |
| 2006/0122812 A1 | 6/2006 | Tinseth | |
| 2007/0078536 A1* | 4/2007 | Gordon et al. | 700/83 |
| 2009/0164933 A1* | 6/2009 | Pederson et al. | 715/772 |
| 2011/0099500 A1* | 4/2011 | Smith et al. | 715/771 |

FOREIGN PATENT DOCUMENTS

| | | |
|---|---|---|
| GB | 2456204 | 7/2009 |
| GB | 2456204 A | 8/2009 |
| JP | H09198126 | 7/1997 |
| JP | 11045824 | 2/1999 |
| WO | 2006039760 | 4/2006 |
| WO | 2006039760 A1 | 4/2006 |

OTHER PUBLICATIONS

Intellectual Property Office of Great Britain, "Examination Report under Section 18(3)", issued in connection with Great Britain patent application No. GB1019075.9, mailed on Apr. 10, 2014, 6 pages.

The State Intellectual Property Office of the People's Republic of China, "The First Office action", issued in connection with chinese patent application No. 201010557494.5, mailed on May 26, 2014, 29 pages.

Japanese Patent Office, "Notice of Reasons for Rejection", issued in connection with japanese patent application No. 2010-259071, mailed on Aug. 5, 2014, 6 pages.

Intellectual Property Office of Great Britain, "Examination Report under Section 18(3)", issued in connection with British patent application No. GB1019075.9, issued in Oct. 14, 2014, 3 pages.

Intellectual Property Office of Great Britain, "Examination Report under Section 18(3)", issued in connection with Great Britain patent application No. GB1019075.9, mailed on Feb. 12, 2015, 3 pages.

Intellectual Property Office of Great Britain, "Combined Search Report and Examination Report under Section 17 and 18(3)", issued in connection with Great Britain patent application No. GB1500381.7, mailed on Feb. 12, 2015, 9 pages.

Japan Patent Office, "Decision of Refusal," issued in connection with Japanese Patent Application No. 2010-259071 mailed Jul. 28, 2015 (6 pages).

Intellectual Property Office of the United Kingdom, "Examination Report under Section 18(3)," issued in connection with British Patent Application No. GB1500381.7, issued May 22, 2015 (4 pages).

Intellectual Property Office of the United Kingdom, "Examination Report under Section 18(3)," issued in connection with British Patent Application No. GB1019075.9, issued May 22, 2015 (4 pages).

* cited by examiner

METHODS AND APPARATUS TO DYNAMICALLY DISPLAY DATA ASSOCIATED WITH A PROCESS CONTROL SYSTEM

FIELD OF THE DISCLOSURE

The present disclosure relates generally to process control systems and, more particularly, to methods and apparatus to dynamically display data associated with a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies or routines using the field devices via the buses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Additionally, process control systems typically include data representations showing monitoring information, diagnostic information, and/or alarms to monitor process control routines, field devices, controllers, and/or communications. The data representations are helpful to operators by displaying process data graphically in the form of charts, graphs, data tables, list boxes, graphical symbols, text, etc. Currently, an operator of a process may have to manually configure a display of data representations in a user interface that may be specific to a process area, a group of field devices, a portion of a process, a type of data, and/or process control components. However, this manual configuration may be burdensome for process control operators because a user interface may have to be constructed for each operator, process control system, process control area, and/or group of field devices. The manual configuration may also lead to the creation of multiple user interface screens with overlapping data representations. Further, when a process control system is modified, the corresponding user interfaces with the data representations may also have to be changed to reflect the modification.

SUMMARY

Example methods and apparatus to dynamically display data associated with a process control system are described. In one example, a method includes receiving in a graphics engine, process control information selected by a user, identifying process data associated with the selected process control information, and retrieving the identified process data from a process controller. The example method further includes determining metadata associated with the retrieved process data, generating in the graphics engine a data representation based on the metadata, and displaying the data representation via a user interface.

An example apparatus includes a data manager to identify process data associated with selected process control information and a metadata generator to determine metadata associated with the retrieved process data. The example apparatus also includes a data representation generator to generate a data representation based on the metadata and a data representation display manager to display the data representation via a user interface.

DETAILED DESCRIPTION

Figure 1:
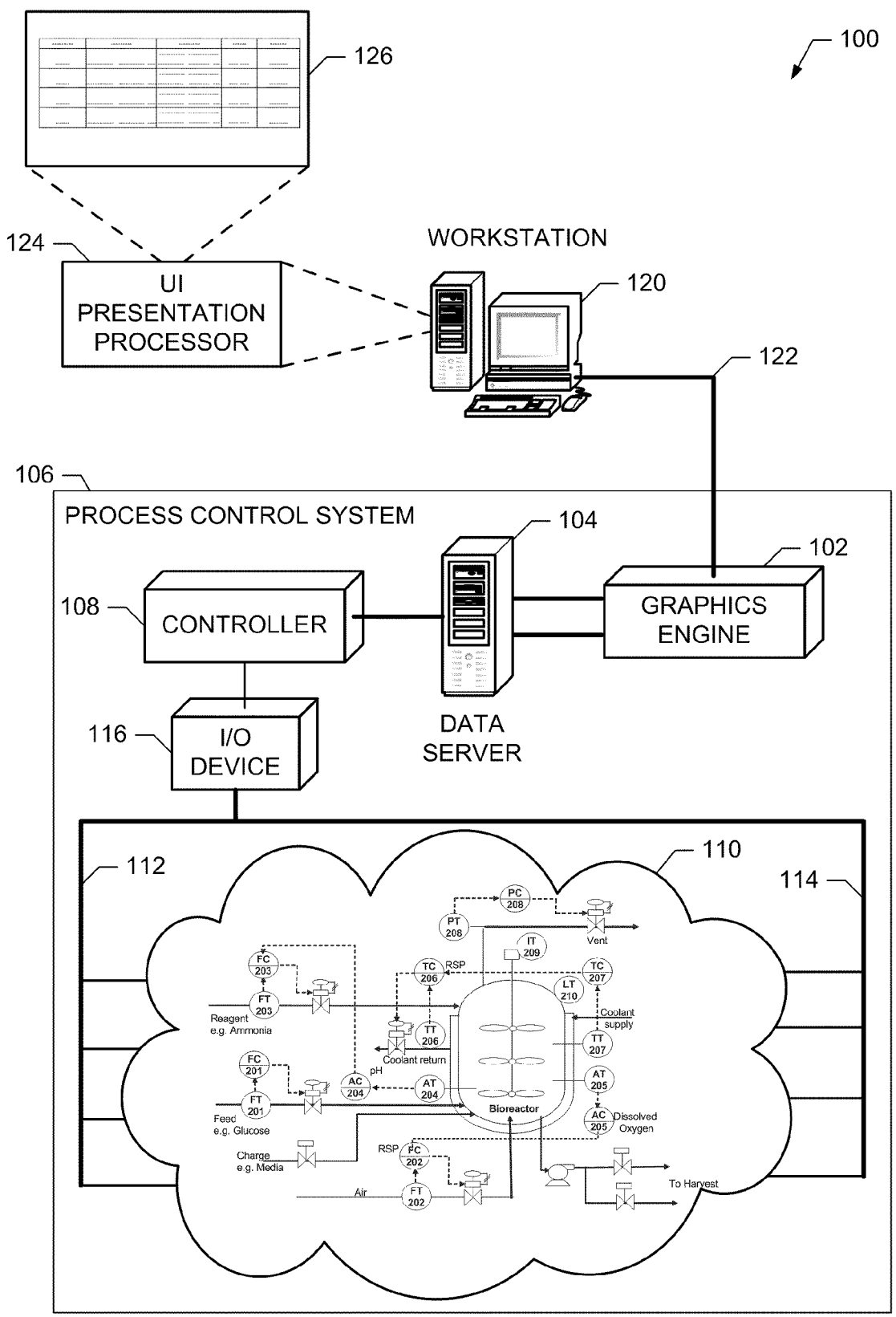
FIG. 1 shows a block diagram illustrating an example process control system including an example graphics engine and an example data server.

Although the following describes example methods and apparatus including, among other components, software and/ or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with dynamically displaying data associated with a process control system, the example method and apparatus are more generally applicable and may be implemented to dynamically display data associated with any automation system, batch processing system, manufacturing system, industrial control system, safety instrumented system, etc.

Typically, process control systems include management and display of information such as process data, alarms, monitoring information, and/or diagnostic information to inform operators of conditions of a process. Process control systems may also include sensors, monitors and/or diagnostics to monitor process control routines, field devices, controllers, and/or communications. Further, information associated with a process control system may be displayed as a graphical data representation via a user interface viewable by an operator on a workstation. The data representation may include process data associated with field devices, interconnections between the field devices, communications between the field devices, outputs of the field devices, functional states of the field devices, and/or any other information that may be associated with a process control system. Additionally, a data representation may be associated with an entire process control system or, alternatively, one or more portions of a process control system.

Currently, data representations are configured manually by an operator and/or a process control engineer based on known components and/or connections within a process control system, a functional block diagram associated with the process control system, and/or any other representation of a process control system. Data representations are helpful to operators by displaying process data graphically in the form of charts, graphs, data tables, list boxes, graphical symbols, text, etc. However, the data representations are generally fixed or static relative to the views specified by an engineer and/or operator. For example, a graph data representation may be used to show a status of a field device in a process. The graph data representation may include one or more data fields that are linked manually by an operator, designer, and/or engineer to the process data originating from the field device. The graph data representation may read the process data referenced in the data fields to display the process data. However, this manual linking of the process data to the data fields creates a static or fixed data representation. If a second field device is added to the process, an operator and/or engineer may have to manually link the process data from the second field device to the graph data representation.

This manual configuration may be burdensome for process control operators and/or engineers because a user interface displaying one or more data representations may have to be constructed for multiple sources of process data. This manual configuration may also produce user interface screens and/or data representations with overlapping information. Further, when a process control system is modified, the corresponding user interfaces and/or data representations may also have to be modified to reflect the changes.

The example methods and apparatus described herein dynamically create data representations that may be displayed via a user interface based on a type of process data (e.g., process control data) selected by an operator and/or engineer. The example methods and apparatus described herein dynamically create data representations by receiving a selection of process control information from an operator and/or engineer (e.g., a user) and identifying process data that is associated with the selected process control information. Process control information may include any identifier of a process control component that generates, processes, and/or manages process data. For example, process control information may include a batch identifier, a process identifier, a controller identifier, a field device identifier, a file associated with the process data, a link to the process data, one or more functional blocks, one or more parameters, one or more process control endpoints, and/or a process control routine. Process control components may include field devices, process controllers, routines, algorithms, I/O cards, and/or any other process control device that is capable of generating and/or processing data.

Upon identifying selected process data, the example methods and apparatus described herein identify and/or create metadata that is associated with the process data. Metadata describes process data by specifying presentation information associated with the process data. Generally, presentation information may include, for example, process data types, process data display preferences, process data formats, lengths and/or sizes of process data, locations of process data, and/or any other definitions or descriptions of process data. The example methods and apparatus described herein use metadata to determine an appropriate data representation type by cross-referencing the metadata to a corresponding data representation type specified in a metadata rules database. The example methods and apparatus create an instance of a determined data representation type and associate the process data with the newly created data representation instance. The example methods and apparatus may associate the process data with the data representation instance by linking and/or inserting a location of the process data into corresponding data fields that are included within the data representation instance. The data representation is generated from the instance by associating the process data with the instance of the data representation type. The example methods and apparatus described herein may then render and display the data representation via a user interface.

In some examples, process data may include and/or be associated with metadata. This included metadata may be added to the process data by field devices that generate the process data, controllers that compile and manage the process data, and/or by routines and/or algorithms that process and store the process data. In other examples where the metadata is not included with the process data, the example methods and apparatus described herein generate metadata by cross-referencing selected process data to a metadata type database that includes metadata definitions based on a process data type. The generated metadata is then associated with the process data and used by the example methods and apparatus described herein to generate the appropriate data representation.

The example methods and apparatus described herein may automatically update and/or modify a displayed data representation upon a change to process data and/or metadata associated with the data representation. For example, changes to a process control system may result in the addition, removal, and/or modification of generated process data and/or metadata associated with the process data. In other examples, an operator and/or an engineer may add, remove, and/or modify process data displayed within a data representation. In both of these examples, the methods and apparatus described herein generate and/or identify metadata associated with the changed system, automatically update the affected data representations, re-render the modified data representations, and display the modified data representations. In this manner, changes made to process data, metadata, and/or a process control system are automatically updated in the affected data representations without an operator and/or engineer having to manually reconfigure and/or re-link the changed process data to the appropriate data fields within the data representations.

Additionally or alternatively, the example methods and apparatus described herein enable process operators, engineers, and/or designers to customize portions of a data representation based on preferences and/or requirements. When an operator customizes a data representation, the example methods and/or apparatus store the customization information with the data representation. The example methods and apparatus may also update other similar types of data representations and/or may update the data representation type with the customization information. Customization information may include, for example, modification of a display of the one or more data representations, a change in color of the one or more data representations, a change in layout of the one or more data representations, a change in graphics associated with the one or more data representations, a change in display format of the one or more data representations, and/or a change in identification associated with the one or more data representations.

By automatically generating data representations based on metadata, the example methods and apparatus described herein provide a dynamic user interface presentation system that creates data representations at a time of request by a user rather than during the development of the user interface. Further, by automatically creating data representations based on a process data type, the example methods and apparatus described herein improve engineer and/or operator productivity by allowing for simultaneous development of a control system and a corresponding graphical user interface. For example, engineers may focus on developing control strategies of a process control system without having to determine how the process data will be displayed. At the same time, user interface developers can focus on developing user interface controls without having to determine the type and/or location of the process data. Furthermore, the example methods and apparatus described herein improve the flexibility of a process control system by dynamically creating data representations based only on selected process control information. The scalability of a process control system may also be improved because the databases used for cross-referencing data representation types to metadata may be updated and/or revised based on engineer and/or operator requirements.

FIG. 1 is a block diagram showing an example process control environment 100 including an example graphics engine 102 and an example data server 104. The example graphics engine 102 and the example data server 104 are located within a process control system 106. However, in other examples the graphics engine 102 and/or the data server 104 may be located outside of the process control system 106 within a server, a distributed computing network, and/or any other computing device(s) that may be communicatively coupled to the process control system 106. Furthermore, the example process control system 106 may include additional data servers (not shown) and/or additional graphics engines (not shown).

The example process control system 106 may include any type of manufacturing facility, process facility, automation facility, safety instrumented facility, and/or any other type of process control structure or system. In some examples, the process control system 106 may include multiple facilities located at different locations. Additionally, the example process control environment 100 may include other process control systems (not shown) that may be included within the same facility and/or located at a different facility.

The example process control environment 100 is provided to illustrate one type of system within which the example methods and apparatus described in greater detail below may be advantageously employed. However, the example methods and apparatus described herein may, if desired, may be advantageously employed in other systems of greater or less complexity than the example process control environment 100 and/or the process control system 106 shown in FIG. 1 and/or systems that are used in connection with process control activities, enterprise management activities, communication activities, etc.

The example process control system 106 of FIG. 1 includes a controller 108 that may be communicatively coupled to the data server 104. The process control system 106 also includes field devices 110 (e.g., input and/or output devices). The field devices 110 may include any type(s) of process control component(s) capable of receiving inputs, generating outputs, and/or controlling a process. The field devices 110 may include control devices such as, for example, valves, pumps, fans, heaters, coolers, and/or mixers to control a process. Additionally, the field devices 110 may include measurement or monitoring devices such as, for example, temperature sensors, pressure gauges, concentration gauges, fluid level meters, flow meters, and/or vapor sensors to measure portions of a process. The control devices may receive instructions from the controller 108 via inputs 112 to execute a specified command and cause a change to the process implemented and/or controlled by the field devices 110. Furthermore, the measurement devices measure process data, environmental data, and/or input device data and transmit the measured data via outputs 114 to the controller 108 as process data. This process data may include the values of variables corresponding to a measured output from each of the field devices 110.

In the illustrated example of FIG. 1, the example controller 108 may communicate with the field devices 110 within the process control system 106 via the inputs 112 and/or the outputs 114. The inputs 112 and the outputs 114 may be implemented by a data bus. This data bus may be coupled to intermediate communication components within the process control system 106. These communication components may include field junction boxes to communicatively couple the field devices 110 in a command area to the data bus. Additionally, the communication components may include marshalling cabinets to organize the communication paths to the field devices 110 and/or field junction boxes. Furthermore, the communication components may include I/O cards 116 (e.g., an I/O device) to receive data from the field devices 110 and convert the data into communications capable of being received by the example controller 108. Additionally, these I/O cards 116 may convert data or communications from the controller 108 into a data format capable of being processed by the corresponding field devices 110. In an example, the data bus may be implemented using the Fieldbus protocol or other types of wired and/or wireless communication protocols (e.g., Profibus protocol, HART protocol, etc.).

The example controller 108 of FIG. 1 manages one or more control routines (e.g., process control algorithms, functions, and/or instructions) to control the field devices 110 within the process control system 106. The control routines may include process monitoring applications, alarm management applications, process trending and/or history applications, diagnostic applications, batch processing and/or campaign management applications, statistical applications, streaming video applications, advanced control applications, safety instrumented applications, etc. The control routine(s) may ensure that the process control system 106 produces specified quantities of a desired product within a certain quality threshold. For example, the process control system 106 may be configured as a batch system that produces a product at a conclusion and/or during a batch process. In other examples, the process control system 106 may include a continuous process manufacturing system that constantly produces products. Furthermore, the controller 108 may forward process data utilized within the control routine(s) to the example data server 104. In other examples, the data server 104 may poll the controller 108 periodically for process data and/or upon a request from the graphics engine 102.

The example process control environment 100 of FIG. 1 includes a workstation 120 communicatively coupled to the graphics engine 102 via a local area network (LAN) 122. The example workstation 120 may include any computing device including a personal computer, a laptop, a server, a controller, a smartphone, a personal digital assistant (PDA), a micro computer, etc. Additionally, the workstation 120 may be implemented using any suitable computer system or processing system (e.g., the processor system P10 of FIG. 13). For example, the workstation 106 could be implemented using a single processor personal computer, single or multi-processor workstations, etc.

The example of FIG. 1 shows the example workstation 120 exterior to the process control system 106. In other examples, the workstation 120 may be included within the process control system 106 and/or communicatively coupled directly to the controller 108. Additionally, the process control environment 100 may include routers (not shown) to communicatively couple other workstations (not shown) to the controller 108, the data server 104, and/or the graphics engine 102 and/or to communicatively couple the workstation 120 to other controllers (not shown) and/or graphics engines (not shown) within other process control systems. Further, the process control environment 100 may include a firewall (not shown) to provide remote workstations (e.g., workstations outside of the process control environment 100) access to resources within the process control environment 100.

The example LAN 122 may be implemented using any desired communication medium and protocol. For example, the LAN 122 may be based on a hardwired or wireless Ethernet communication scheme. However, any other suitable communication medium and protocol could be used. Furthermore, although a single LAN 122 is shown, more than one LAN and appropriate communication hardware within the workstation 120 may be used to provide redundant communication paths between the workstation 120 and a respective similar workstation (not shown).

The example workstation 120 and/or other workstations (not shown) with access to the process control system 106 may be configured to view, modify, and/or correct one or more processes within the process control system 106. For example the workstation 120 may include a user interface (UI) presentation processor 124 that formats, manages, and/or displays data representations generated by the graphics engine 102. The UI presentation processor 124 displays the data representation via a user interface 126. The example user interface 126 may be displayed in a graphical window that is part of the workstation 120 to show one or more data representations. The workstation 120 may be capable of displaying more than one user interface 126 via additional UI presentation processors (not shown). Alternatively, the example UI presentation processor 124 may be capable of managing multiple user interfaces 126.

The example user interface 126 in FIG. 1 shows a data representation associated with the field devices 110. An operator initiates the generation of the data representation by selecting process control information that the operator desires to view as a data representation. The process control information may be selected by the operator selecting in the user interface 126 an icon, a file name, one or more functional blocks, a portion of a schematic of the process control system, and/or an identifier associated with the process control information. The graphics engine 102 receives the selection and determines process control variables, field devices 110, inputs 112, outputs 114, functional blocks, parameters, applications, routines, and/or other process control components that are associated with the selected process control information. The graphics engine 102 then retrieves process data by sending identifiers of the process control components that are associated with the selected process control information to the data server 104. The example data server 104 identifies the process data and/or storage locations of the process data and forwards this information to the graphics engine 102. In some examples, the process data may already be stored on the data server 104. In other examples, the process data may be stored or located at the controller 108. In the latter examples, the data server 104 may request the controller 108 to forward the requested process data. The request may include a read request and/or a subscribe request.

Prior to sending the process data to the graphics engine 102, the example data server 104 of FIG. 1 determines metadata associated with the process data. In some cases, the metadata may already be associated with and/or embedded within the process data. In other examples where the process data does not include metadata, the data server 104 generates metadata by cross-referencing the process data to a metadata type in a database. Upon determining metadata associated with the selected process data, the data server 104 forwards the metadata and process data to the graphics engine 102. The graphics engine 102 may then parse the metadata by applicable metadata identifiers. The metadata identifiers within the metadata describe how associated process data is displayed within a data representation. For example, metadata identifiers may include a tag indicating a type of data representation (e.g., a graph, a chart, a table, etc.), a format for displaying the process data (e.g., font size, font type, font color, text justification, etc.), a data type for displaying the process data (e.g., decimal, hexadecimal, string, text, etc.), and/or a display property of the process data (e.g., column, row, graph data, status data, etc.).

The example graphics engine 102 may then identify types of the parsed metadata and cross-reference the metadata types to data representation types. For example, the graphics engine 102 may generate an instance of a data representation type and associate metadata to the instance of the data representation. Specifically, the graphics engine 102 may copy a data representation type template and match the metadata to data fields within the data representation copy. For example, a table data representation may include data fields in rows and columns. The example graphics engine 102 may locate metadata with a column metadata identifier and link process data associated with the matched metadata to the column data field.

In some examples, the graphics engine 102 may determine multiple data representation types for a type of metadata. In these examples, the graphics engine 102 may prompt an operator at the workstation 120 to select a data representation type. Alternatively, the graphics engine 102 may determine if other data representations of the same type have been specified to be associated with the metadata type. Further still, the graphics engine 102 may create a data representation for each of the matching data representation types.

The graphics engine 102 of FIG. 1 displays the created data representation by rendering the data representation and sending the rendering to the UI presentation processor 124 in the workstation 120. The UI presentation processor 124 then converts the rendering into the displayed version of the data representation via the user interface 126. The graphics engine 102 renders the data representation into a visual display by accessing each of the data fields associated with the data representation to retrieve the process data linked to those data fields and then creates the display rendering for the process data according to function of the data representation (e.g., a graph function, a table function, a chart function, etc.).

The example graphics engine 102 of FIG. 1 also modifies data representations based on changes to process data and/or metadata. In some examples, changes to the field devices 110 and/or the process control system 106 may result in the addition, removal, and/or modification of process data. In other examples, a process control engineer and/or operator may add, remove, and/or modify process data and/or metadata associated with process data. The graphics engine 102 may detect a change in process data and/or metadata and subsequently modify the affected data representation accordingly. The graphics engine 102 may detect changes to process data and/or metadata by receiving a change indication from the data server 104. In other examples, the graphics engine 102 may poll the data server 104 for any changes to metadata and/or process data. Additionally or alternatively, the graphics engine 102 may receive operator initiated changes from the workstation 120 via the UI presentation processor 124.

For example, a data representation may show a status of a first temperature sensor field device 110. If a second temperature sensor is added to the process control system 106, the graphics engine 102 may detect the output from the new temperature sensor and/or the metadata associated with the output of the new temperature sensor. The graphics engine 102 then determines the data representation associated with the status of the first temperature sensor and adds a link for the status of the second temperature sensor to the appropriate data field within the data representation. In another example, an operator may modify metadata associated with an output from a sensor by changing a data type representation from a text field to a graph. Upon detecting the change in the metadata, the example graphics engine 102 modifies the data representation by changing the representation type to a graph and linking the process data from the sensor to a data field included within the graph. The graphics engine 102 may then render the graph data representation for display in the user interface 124.

Furthermore, the example graphics engine 102 may manage customization of data representations by operators and/or engineers. When an operator customizes a data representation, the graphics engine 102 may determine associated process data and/or metadata. The graphics engine 102 may also modify and display the data representation based on the customized information. Further, the graphics engine 102 may store the customization information for the data representation such that if the same data representation is accessed at a later time, the same customization can be applied to the data representation prior to displaying the data representation.

Figure 2:
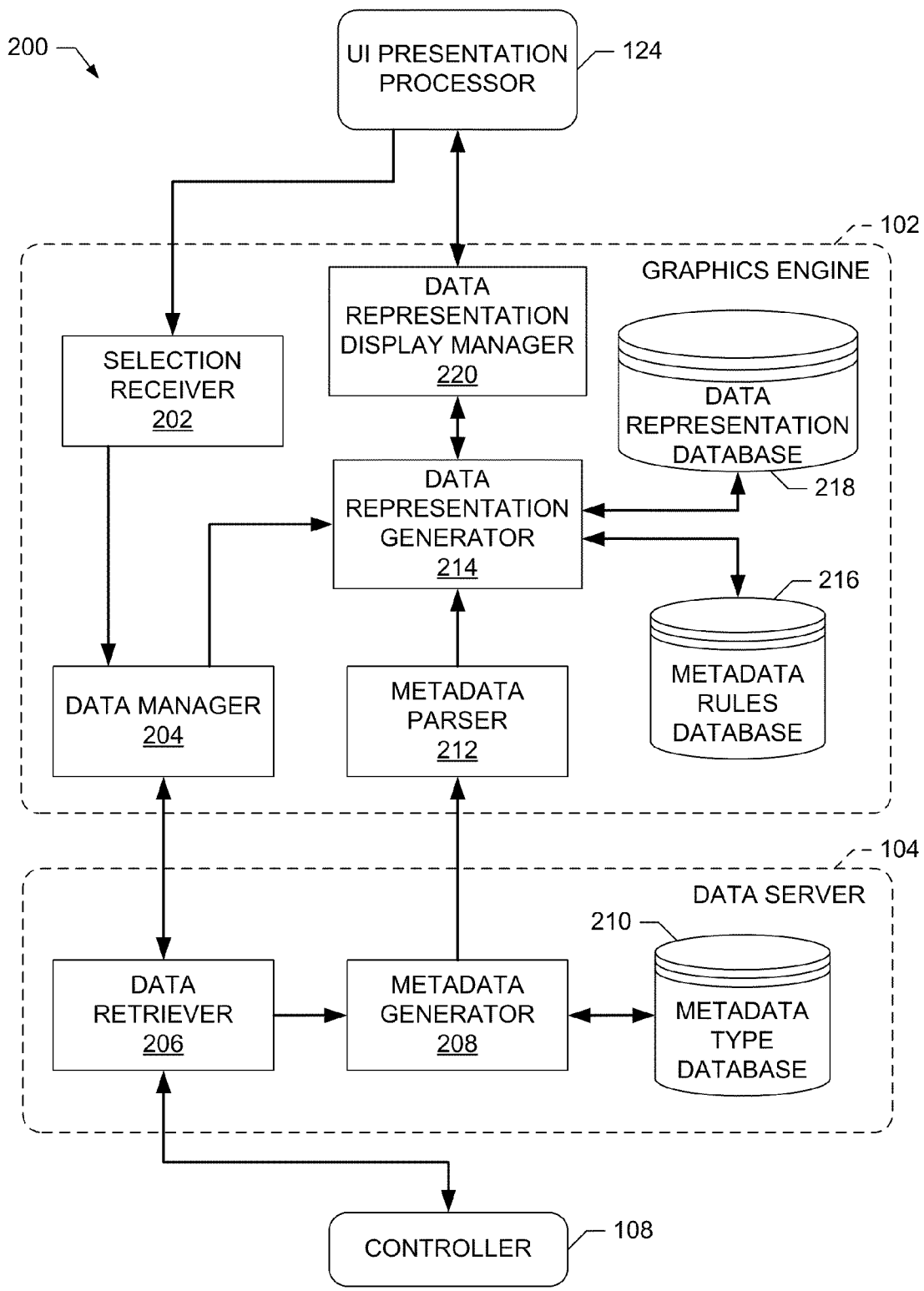
FIG. 2 shows a functional block diagram of the example graphics engine and the example data server of FIG. 1.

FIG. 2 is a functional block diagram 200 of the example graphics engine 102 and the example data server 104 of FIG. 1. While the example graphics engine 102 and the example data server 104 are shown as separate functional blocks, in other examples, the data server 104 may be included within the graphics engine 102. Alternatively, the graphics engine 102 and the data server 104 may be combined together within a single functional block. Additionally, while FIG. 2 shows the graphics engine 102 communicatively coupled to the data server 104 and the UI presentation processor 124, the graphics engine 102 may be communicatively coupled to other data servers and/or UI presentation processors. Further, while the example data server 104 is shown communicatively coupled to the controller 108, the data server 104 may be communicatively coupled to other controllers.

To receive process control information selected by an operator via the UI presentation processor 124, the example graphics engine 102 includes an example selection receiver 202. Selected process control information may include, but is not limited to a batch identifier, a process identifier, a controller identifier, a field device identifier, a file associated with the process data, a link to the process data, one or more functional blocks, one or more parameters, one or more process control endpoints, and/or a process control routine. The UI presentation processor 124 compiles the selected process control information and forwards the information to the selection receiver 202. Upon receiving the process control information, the selection receiver 202 queues the process control information until a data manager 204 is available to process the process control information.

To identify process data associated with selected process control information, the example graphics engine 102 of FIG. 2 includes the data manager 204. The example data manager 204 identifies process data by identifying process control components that may generate, process, and/or manage process data associated with selected process control information. The process control components correspond to the selected process control information and may include field devices, process controllers, routines, algorithms, I/O cards, and/or any other process control device that is capable of generating and/or processing data.

Upon identifying the process control components, the example data manager 204 sends a request to the data server 104 for process data that may be generated, processed, and/or associated with the identified process control components. For example, an operator may select field devices on a schematic displayed by the UI presentation processor 124 to view process data generated by the field devices. The UI presentation processor 124 sends identification values of the field devices (e.g., process control information) to the selection receiver 202, which then forwards those identification values to the data manager 204. The data manager 204 identifies the field device identification values as field devices (e.g., process control components) and sends a request to the data server 104 for process data that is associated with the field devices.

In other examples, an operator may select multiple portions of a schematic or multiple functional blocks. In these examples, the process control information may include multiple field device identifiers, alarm identifiers, parameters calculated by a routine based on outputs from the field devices, and/or output variable names corresponding to outputs generated by the field devices. In these examples, the data manager 204 organizes the process control information by type, location, and/or any other filterable characteristic before sending a request to the data server 104 for the associated process data. In this manner, the example data manager 204 organizes the process data so that each portion of process control information will correspond to process data retrieved by the data server 104.

To retrieve process data, the example data server 104 of FIG. 2 includes a data retriever 206. The example data retriever 206 receives requests from the data manager 204, identifies process data associated with the requested process control components and/or information, determines a location of the process data, and forwards the process data to the data manager 204. In some examples, process data may be located within a database in the data server 104 that is accessible by the data retriever 206. In other examples where the data retriever 206 determines that the process data is not located in the data server 104, the data retriever 206 may send a request to the controller 108 for process data. In either example, the data retriever 206 may obtain the process data by sending a read request and/or a subscribe request. In examples where a subscribe request is sent, the data retriever 206 may periodically receive process data that the data retriever 206 then forwards to the data manager 204. In these examples, data representations displayed by the UI presentation processor 124 may be automatically updated with current process data as the process data becomes available to the data retriever 206.

Upon the data retriever 206 receiving requested process data, the data retriever 206 links the process data to the process control components and/or information sent by the data manager 204 and sends the linked information to the data manager 204. In this manner, the data manager 204 can determine that the received process data corresponds to selected process control information and/or components. In other example implementations, the data retriever 206 may send the process data to the data manager 204 without linking the corresponding process control information and/or components.

In examples where a change occurs in the process control system and/or to process data that is being utilized within a data representation, the example data retriever 206 receives an indication of the change, retrieves process data associated with the change, and forwards the process data to the data manager 204. Alternatively, the data retriever 206 may poll the controller 108 periodically to determine if there are any changes to process data and/or the process control system that may affect a data representation. For example, if the data retriever 206 has retrieved process data originating from field devices in a specific process control area, the data retriever 206 may forward process data to the data manager 204 from a field device that has been newly added to that specific process control area.

In addition to retrieving process data, the example data server 104 includes a metadata generator 208 to determine metadata associated with retrieved process data. The example metadata generator 208 receives a copy of retrieved process data from the data retriever 206 and determines if there is metadata embedded within and/or associated with the process data. In some examples, the embedded and/or associated metadata may be included within a header of the process data. In other examples, the metadata may be included within a string, data word, and/or line of process data. If there is metadata associated with the process data, the metadata generator 208 determines if the metadata is sufficient to generate a data representation. Metadata sufficient to generate a data representation may include metadata that identifies a type of process data, a format of the process data, and/or a display preference of the process data.

For example, process data transmitted via a message and/or a data word may describe a batch numeric identifier and have a process data value of "20080229.163450." The message and/or data word may also include bytes and/or words for metadata associated with the data value including the metadata "Column Value," "<Name Batch ID>," "<Length 14>," and "<Type Decimal>." The metadata generator 208 identifies the metadata by code names, identifiers, and/or symbols including "<," ">," "Column Value," "Name," "Length #," and "Type." Upon identifying sufficient metadata, the metadata generator 208 forwards the process data and metadata to the graphics engine 102.

In another example, if a message and/or a data word only includes process data and/or only includes insufficient metadata, the example metadata generator 208 may identify the process data and cross-reference the process data to a metadata type. A metadata type database 210 may include list(s) that the metadata generator 208 may utilize to cross-reference process data to metadata types. The metadata type database 210 may be implemented by Electronically Erasable Programmable Read-Only Memory (EEPROM), Random Access Memory (RAM), Read-Only Memory (ROM), and/or any other type of memory.

In an example, the metadata generator 208 may receive a process data value of "20080229.163450." The example metadata generator 208 may then determine that the process data value is a 14 digit decimal value with a format of "########.######". The metadata generator 208 may access the metadata type database 210 to cross-reference the format "########.######" to a metadata identifier or type. In this example, the format "########.######" may cross-reference to metadata identifiers for a batch identifier including, for example, the metadata identifiers "Name Batch ID," "Length 14," "Type Decimal," and "Column Value." The metadata generator 208 associates the determined metadata types and/or identifiers with the process data value by either embedding the metadata within a header or other data byte and/or word of the process data and/or by linking the metadata to the process data. The metadata generator 208 then transmits the metadata and the process data to the graphics engine 102.

In examples where the process data may include a string of data and/or different portions of process data, the example metadata generator 208 determines metadata identifier(s) and/or type(s) for each portion and/or for each data value within the string. For example, a request for process data associated with a batch type may cause the data retriever 206 to retrieve a string of batch process data associated with the batch type (e.g., "20080229.163450; Chocolate Chip Cookie; Makes 500 lbs dark Chocolate Chip cookies; Feb. 29, 2008; 0:23:31 AM; 0:53:45). The example metadata generator 208 separates the different process data values based on the locations of semi-colons within the string. In other examples, the separator may be a comma, a dash, and/or any other symbol or code. The metadata generator 208 may determine a metadata identifier for each process data value based on the corresponding data format and then associate that metadata with the process data. The metadata generator 208 then forwards the process data string and the determined metadata to the graphics engine 102.

To parse the metadata so that the metadata may be used to generate data representations, the example graphics engine 102 of FIG. 2 includes a metadata parser 212. The example metadata parser 212 determines which metadata associated with process data is relevant or useful to generate a data representation. Excess or irrelevant metadata is filtered out by the metadata parser 212 and relevant metadata is forwarded to a data representation generator 214 to create data representations. The metadata parser 212 may parse metadata that is associated with the process data by field devices, routines, controllers and/or other process control components. For example, the metadata parser 212 may determine that some metadata that identifies I/O cards is irrelevant for generating a data representation. Alternatively, metadata generated by the metadata generator 208 may not usually be parsed out by the metadata parser 212. In other examples, the metadata parser 212 may separate metadata within a string of metadata so that process data may be associated with the corresponding portion of metadata. Upon parsing the metadata, the metadata parser 212 forwards the parsed metadata to the data representation generator 214.

To generate or create data representations based on metadata, the example graphics engine 102 of FIG. 2 includes the data representation generator 214. The example data representation generator 214 combines metadata received from the metadata parser 212 with the corresponding process data received from the data manager 204 based on tags associated with the process data and/or the metadata. In other examples, the data representation generator 214 may receive metadata and the associated process data from the metadata parser 212. In these other examples, the data representation generator 214 may resolve and/or compare the process data received from the metadata parser 212 to process data received from the data manager 204 to ensure that values of the process data have not been altered, misaligned, or reformatted by the metadata generator 208.

Upon receiving the metadata and the associated process data, the example data representation generator 214 automatically generates one or more data representations by identifying the type(s) of the metadata, cross-referencing the identified metadata type(s) with at least one data representation type in a metadata rules database 216, and generating an instance of the at least one data representation type associated with the identified metadata type(s). The example data representation generator 214 then associates the process data with the newly created instance of the at least one data representation type by associating the metadata with one or more data fields in the instance of the at least one data representation type and associating the process data associated with the metadata with the data fields in the instance of the at least one data representation type to create the data representation.

The example data representation generator 214 identifies the metadata type by code name, identifier, and/or symbol. The data representation generator 214 then accesses the metadata rules database 216 to cross-reference the identified metadata type to one or more data representation types. The metadata rules database 216 may be implemented by EEPROM, RAM, ROM, and/or any other type of memory and may include one or more lists of metadata types organized by metadata identifier or symbol cross-referenced to an identifier for a data representation type. For example, a metadata identifier of "Column" may be cross-referenced to a table data representation type. In other examples, a metadata identifier of "Time Axis Data" may cross-reference to a line graph data representation type. In yet another example, a metadata identifier of "Expected Contribution" may cross-reference to a bar chart data representation type. The lists stored in the metadata rules database 216 may be originally created by a designer of the graphics engine 102 and/or a graphics designer. Furthermore, the lists may be updated or otherwise modified by process control engineers and/or operators.

In some examples, the data representation generator 214 may determine multiple metadata identifiers and/or types associated with a portion of process data and cross-reference the multiple metadata identifiers and/or types to a data representation type. Additionally, in some examples, the data representation generator 214 may identify two or more possible data representation types based on the metadata type(s) and/or identifier(s). In these examples, the data representation generator 214 may prompt a user via the UI presentation processor 124 to select a data representation type. Alternatively, the data representation generator 214 may generate two or more data representation types or access a data representation database 218 to determine if a user has specified a preference for a data representation type based on the metadata type(s) and/or identifier(s). The data representation database 218 may be implemented by EEPROM, RAM, ROM, and/or any other type of memory.

Upon determining a data representation type, the example data representation generator 214 generates an instance of the data representation type by creating a copy of the data representation type template. An instance is a data representation that does not include a linkage to process data. To create the data representation from the instance, the data representation generator 214 associates metadata with the data representation instance by matching identifiers of the metadata to data fields within the instance. For example, a table data representation type may have data fields for columns and rows. The example data representation generator 214 identifiers metadata within an identifier of "Column" or "Row" and links the associated process data to the corresponding data field. The data representation generator 214 may also link or include the metadata within the data field to enable the UI presentation processor 124 to format the process data when the data representation is displayed. For example, a "Type Decimal" metadata identifier may be associated with the process data in a data field so that the process data is displayed in a numeric decimal format.

The example data representation generator 214 links process data to a data field by identifying process data associated with metadata that matches a data field and inserting the process data into the matching data field. Alternatively, the data representation generator 214 may insert a location (e.g., a file directory location) of the process data that may be used by the data representation display manager 220 to access the process data. The example data representation generator 214 links the data fields within the instance until the all of the process data associated with the data representation type are linked. When the data fields of the instance of the data representation type are linked to process data, the data representation is created.

Upon creating a data representation, the example data representation generator 214 of FIG. 2 stores a copy of the data representation including the linked process data and associated metadata to the data representation database 218. A copy is stored so that the same data representation may be quickly accessed and displayed when a user (e.g., an operator and/or an engineer) selects the same process control information and/or requests to view the data representation. The data representation database 218 may also store user customization information for a data representation.

The example data representation generator 214 initiates the display of a data representation by sending the data representation to a data representation display manager 220. The example data representation display manager 220 displays a received data representation by rendering the data representation for display and forwarding the rendering to the UI presentation processor 124. The data representation display manager 220 may render the data representation by generating an image of the data representation based on applying the process data within the data fields to the graphical data representation. In examples where the data fields include locations of the process data, the data representation display manager 220 accesses those data locations for the process data values.

Upon receiving the rendering of the data representation, the UI presentation processor 124 displays the data representation in a user interface (e.g., the user interface 126) viewable by the user. The example UI presentation processor 124 may display data representations in one or more user interfaces specified by a user. In some examples, a user interface may include, for example, a control interface, a graphical interface, a web browser, an application, and/or any other display program that is capable of displaying data representations.

In examples where a user may customize a data representation, the example data representation display manager 220 receives the customization information from the UI presentation processor 124. The customization information may include the data representation, metadata associated with the data representation, and/or process data associated with the data representation. The data representation may be customized by the user modifying a display of the data representation, changing a color of the data representation, changing a layout the data representation, changing graphics associated with the data representation, changing a display format of the data representation, changing an identification associated with the data representation, etc. Upon receiving the customization information, the data representation display manager 220 forwards the customization information to the data representation generator 214.

The example data representation generator 214 references the customization information to the associated data representation and may access the data representation database 218 to store the customization with the data representation. Additionally, the data representation generator 214 modifies the data representation based on the customization information. For example, if a user selects to change a font color of data being displayed within a data representation, the data representation generator 214 receives the font color change as customization information, determines the metadata and/or process data that the user specified to have the font color change, and applies the font color change to the process data by changing the metadata associated with the font color to the font color selected by the user. In examples where the data representation does not include metadata and/or a metadata identifier associated with font color, the example data representation generator 214 creates font color metadata and associates the font color metadata with the corresponding process data.

Upon updating the data representation to reflect the customization information from a user, the data representation generator 214 sends the data representation to the data representation display manager 220. The data representation display manager 220 then re-renders the data representation with the customization information and sends the rendered data representation to the UI presentation processor 124 for display within a user interface.

Additionally, in examples where a user modifies the data representation by changing process data and/or a definition of the data representation, the UI presentation processor 124 sends the modified data representation to the data representation generator 214. Changing the process data may also include, for example, adding a second data representation to the data representation, adding a parameter (e.g., process data) to the data representation, removing a parameter from the data representation, modifying a parameter type (e.g., process data type and/or metadata type) of the data representation, or modifying a visualization of the data representation. In other examples, changes to a data representation may result from changes to process data, metadata, and/or components within field devices (e.g., the field devices 110 of FIG. 1), a process control system (e.g., the process control system 106), and/or a controller (e.g., the controller 108).

Upon receiving the change information, the data representation generator 214 modifies the metadata, process data, and/or definitions of the data representation based on the change to the process data and/or the metadata. The data representation generator 214 then stores the modified data representation to the data representation database 218 and sends the modified data representation to the data representation display manager 220 for display within a user interface. In this manner, the data representation generator 214 ensures that any user and/or system specified changes to process data and/or metadata are automatically reflected in the affected data representations.

While an example manner of implementing the graphics engine 102 and the data server 104 is depicted in FIG. 2, one or more of the interfaces, data structures, elements, processes and/or devices illustrated in FIG. 2 may be combined, divided, rearranged, omitted, eliminated and/or implemented in any other way. For example, the example selection receiver 202, the example data manager 204, the example data retriever 206, the example metadata generator 208, the example metadata type database 210, the example metadata parser 212, the example data representation generator 214, the example metadata rules database 216, the example data representation database 218, and/or the example data representation display manager 220 illustrated in FIG. 2 may be implemented separately and/or in any combination using, for example, machine-accessible or readable instructions executed by one or more computing devices and/or computing platforms (e.g., the example processing platform P10 of FIG. 13).

Further, the example selection receiver 202, the example data manager 204, the example data retriever 206, the example metadata generator 208, the example metadata type database 210, the example metadata parser 212, the example data representation generator 214, the example metadata rules database 216, the example data representation database 218, the example data representation display manager 220, and/or more generally, the graphics engine 102 and/or the data server 104 may be implemented by hardware, software, firmware and/or any combination of hardware, software and/or firmware. Thus, for example, any of the example selection receiver 202, the example data manager 204, the example data retriever 206, the example metadata generator 208, the example metadata type database 210, the example metadata parser 212, the example data representation generator 214, the example metadata rules database 216, the example data representation database 218, the example data representation display manager 220, and/or more generally, the graphics engine 102 and/or the data server 104 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3:
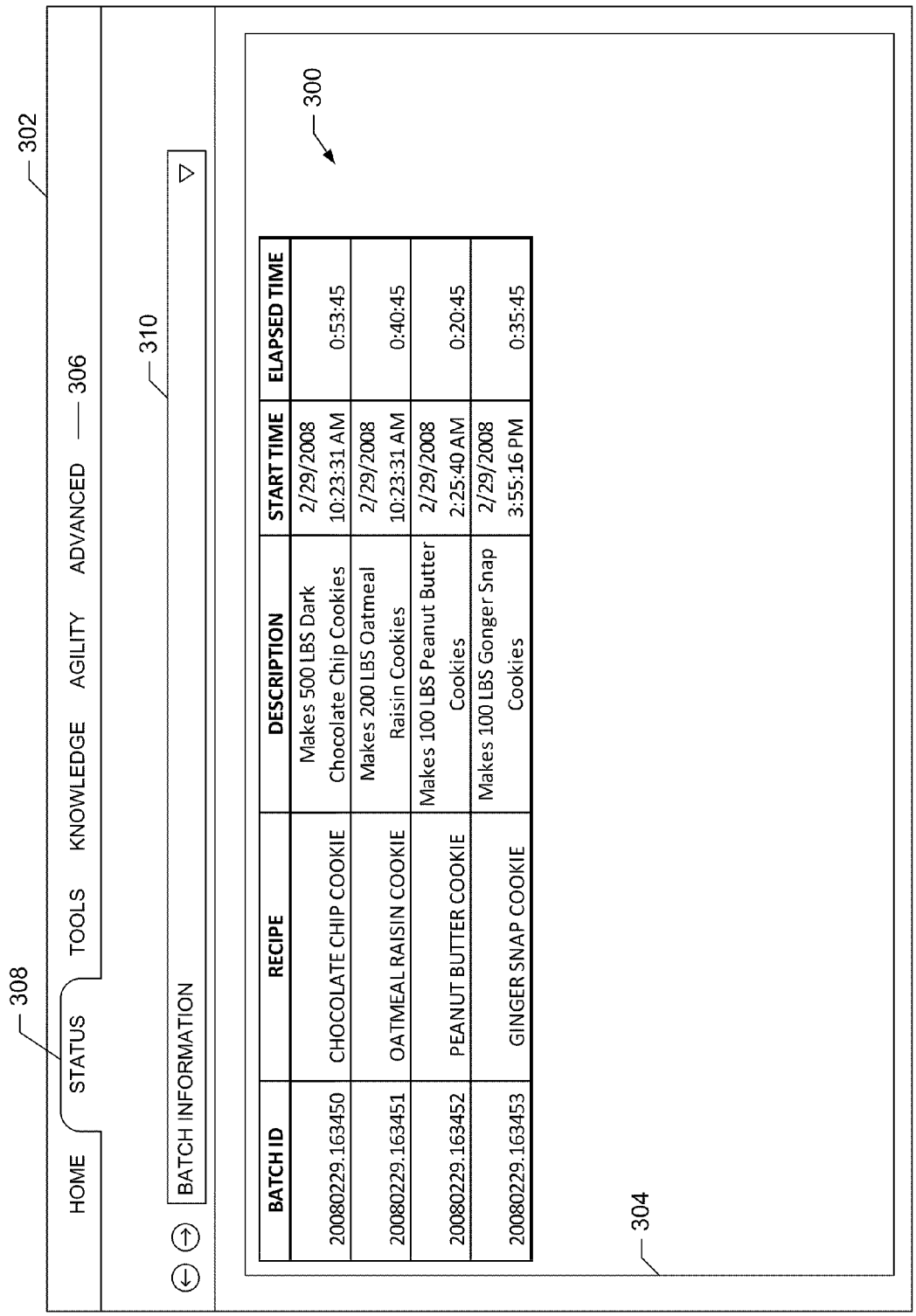
FIG. 3 shows an example data representation for a batch-based process control system.

FIG. 3 shows an example data representation 300 displayed via a user interface 302 for a batch-based process control system. The batch-based process control system may include the process control system 106 of FIG. 1. In this example, the process control system may manufacture cookies, where each type of cookie is associated with a different batch (e.g., Chocolate Chip, Peanut Butter, Oatmeal Raisin and Ginger Snap). The example user interface 302 includes a display area 304 that includes the data representation 300. Additionally, the user interface 302 includes a menu bar 306.

In this example, a Status item 308 in the menu bar 306 is selected to open the display area 304 for the data representation 300. In other examples, the menu bar 306 may include fewer or additional menu selection items. Additionally, the menu bar 306 may include icons and other selectable functions for displaying, managing, modifying, customizing, and/or monitoring process data.

The example user interface 302 also includes an information selection bar 310. The information selection bar 310 enables an operator and/or an engineer to specify process control information to view within the display area 304. In this example, the operator may specify the process control information by typing the name of the process control information (e.g., Batch Information). In other examples, an operator and/or an engineer may select process control information by browsing a file directory, selecting a file name, highlighting a portion of a schematic, highlighting functional boxes in a functional diagram, etc.

Upon the operator and/or engineer entering the process control information within the information selection bar 310, the graphics engine 102 of FIGS. 1 and/or 2 identifies process components associated with the process control information "Batch Information." The graphics engine 102 uses the data server 104 to retrieve associated process data and to generate metadata. In the example of FIG. 3, the process data may be in the form of a data string or a data word for each batch. For example, the process data for the first row (e.g., the chocolate chip cookie batch) of the data representation 300 may be structured as a data string "20080229.163450; Chocolate Chip Cookie; Makes 500 LBS Dark Chocolate Chip Cookie; Feb. 29, 2008; 10:23:31 AM; 0:53:45." In other examples, the process data may be organized by a type of process data.

Further, the process data may be associated with metadata including metadata associated with the Batch ID, Recipe, Description, Start Time, and Elapsed Time headers. The process data under the Batch ID header may be associated with metadata identifiers and/or types that include, for example, "<Name Batch ID>," "<Length 14>," "<Type String>," and "<column>" Likewise, the process data under the Recipe header may be associated with metadata identifiers and/or types that include, for example, "<Name Recipe>," "<Length 25>," "<Type String>," and "<column>" Similarly, the process data under the other headers may be associated with metadata identifiers and/or types.

The graphics engine 102 of FIGS. 1 and/or 2 generates the data representation 300 of FIG. 2 by determining that the metadata associated with the process data cross-references to a table data representation type. The graphics engine 102 then determines which process data corresponds to which data fields in an instance of the table data representation type. In this example, the graphics engine 102 (e.g., the data representation generator 214) may determine from the metadata that there are five different types of process data that can be organized into five different columns. The graphics engine 102 assigns each process data type to a column, using the metadata identifier "<Name/Value/>" (e.g., "<Name Batch ID>") as the title for each column. The graphics engine 102 also links the process data within each data field by matching metadata associated with the process data to an identifier for the column. Furthermore, the graphics engine 102 may align the process data so that the process data in each row is associated with the same data string and/or data word. The graphics engine 102 then links the process data to the corresponding data fields, renders the resulting table data representation 300, and sends the rendering to the UI presentation processor 124 to display the data representation 300 via the user interface 302.

Further, the process data associated with elapsed time may periodically change as time elapses. For this process data, the data server 104 may subscribe to the controller 108 for the elapsed time process data. Then, as the elapsed time process data changes, the data representation 300 can display the most recent value of the elapsed time process data.

Figure 4:
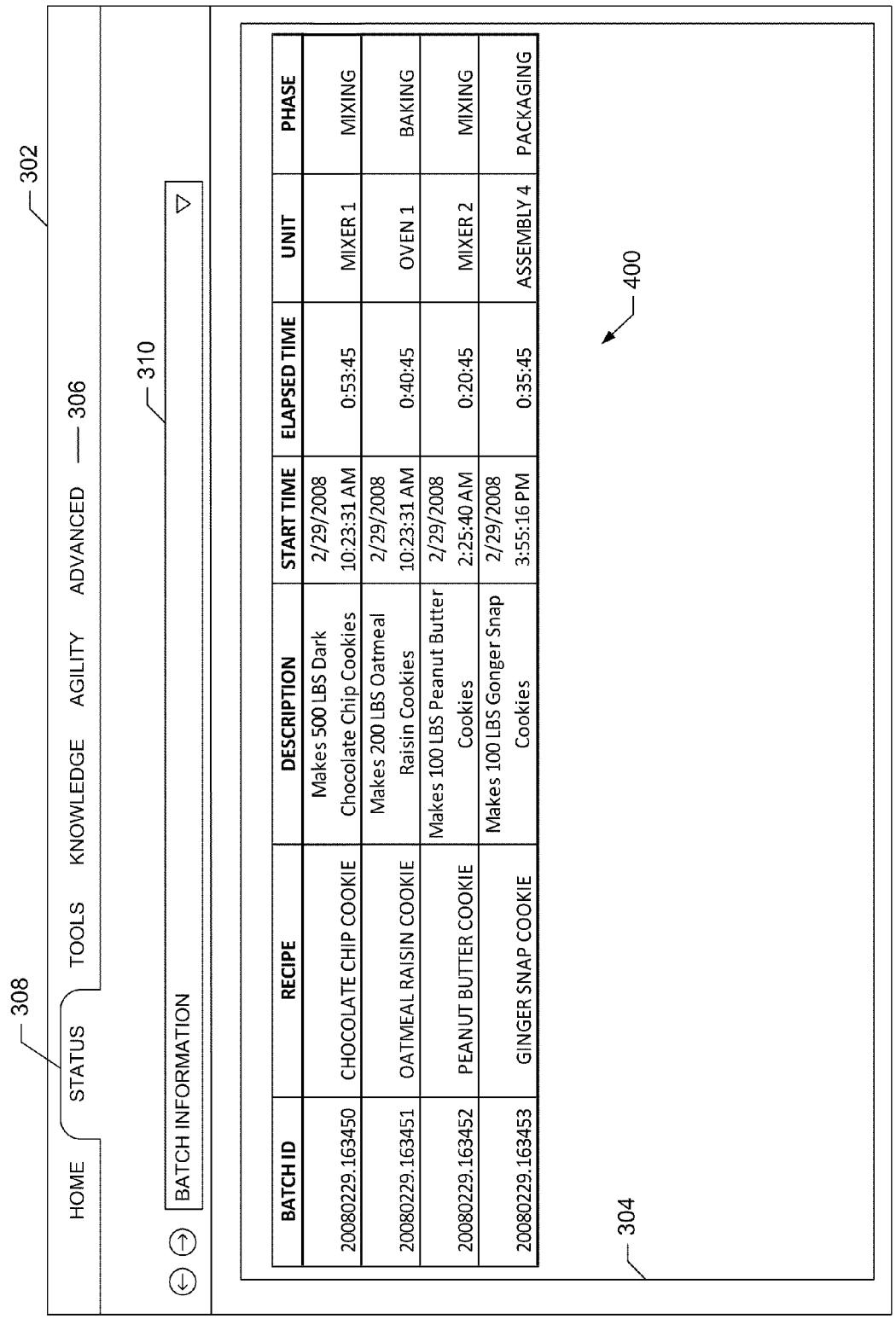
FIG. 4 shows the example data representation of FIG. 3 with a modification involving additional process data.

FIG. 4 shows the example data representation 300 of FIG. 3 with an addition of process data (e.g., process data associated with Unit and Phase) to create a data representation 400. In the example of FIG. 4, the operator and/or engineer may specify that the data representation 300 of FIG. 3 is to include process data for unit and phase. In other examples, changes to the process control system may result in process data and/or metadata associated with unit and phase being added to the process control information "Batch Information." In these other examples, the graphics engine 102 may receive a notification of the change from the controller 108.

Upon receiving the change, the data server 104 determines metadata for the unit and phase process data and forwards this information to the graphics engine 102. The graphics engine 102 then accesses the data representation 300 of FIG. 3 and determines that the metadata associated with the unit and phase process data correspond to column data fields and creates the Unit and Phase columns. The graphics engine 102 then links the unit and phase process data to the data representation 400 for the appropriate Batch ID and re-renders the data representation 400 for display within the user interface 302. In this example, the unit and phase process data may be included within the data word and/or data string for the batch data. Alternatively, the unit and phase process data may include metadata that identifies the Batch ID that is associated with the unit and phase process data.

Figure 5:
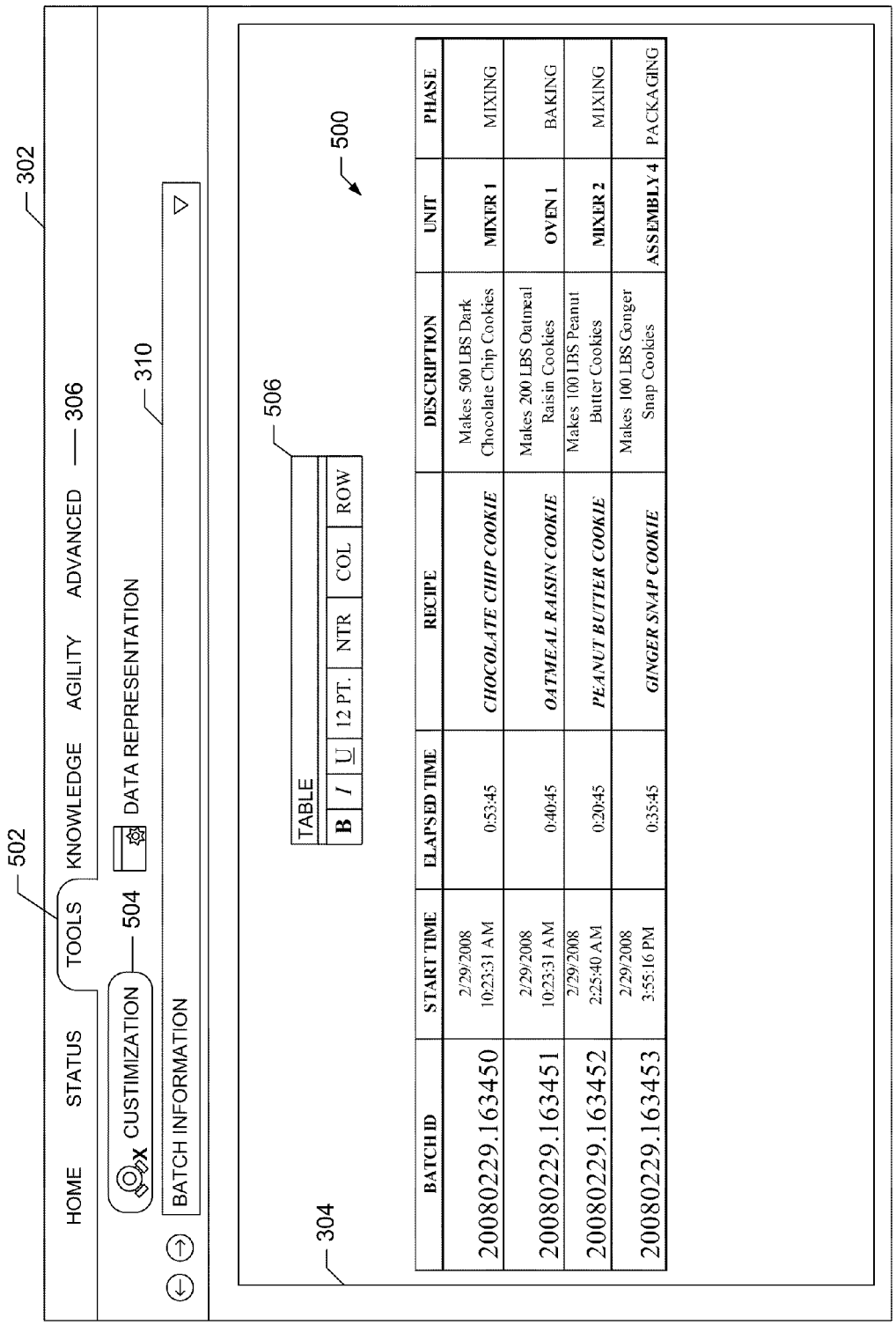
FIG. 5 shows the example data representation of FIG. 4 with customization specified by a process control operator.

FIG. 5 shows the example data representation 400 of FIG. 4 with customization implemented by a process control operator to create a data representation 500. In this example, the operator specified customization information by selecting a tools tab 502 in the menu bar 306 and selecting a customization icon 504 to display a table edit box 506. Using the table edit box 506, the operator is able to change the font type of the text in the data representation 500 to Times New Roman, increase the font size of the process data associated with the Batch ID header, decrease the font size of the process data associated with the Start Time and Elapsed Time headers, and bold the font for the process data associated with the recipe and Unit headers. Additionally, the operator is able to move the Start Time and Elapsed Time columns next to the Batch ID column. In other examples, different edit boxes may include editing and/or customization functions that are associated with a type of data representation. For example, a bar graph data representation may include customization functions for the bars of the graph.

Upon receiving the customization information selected by the operator, the graphics engine 102 of FIGS. 1 and/or 2 updates the data representation 400 of FIG. 4 to reflect the changes specified in the customization information to create the data representation 500. Additionally, the graphics engine 102 stores the customization information and the data representation 500 to the data representation database 218. In some examples, the graphics engine 102 updates the data representation 500 as the operator is selecting and performing the customization. In other examples, the graphics engine 102 may receive the selected customization information and modify the data representation 500 at a single time based on the customization information.

Figure 6:
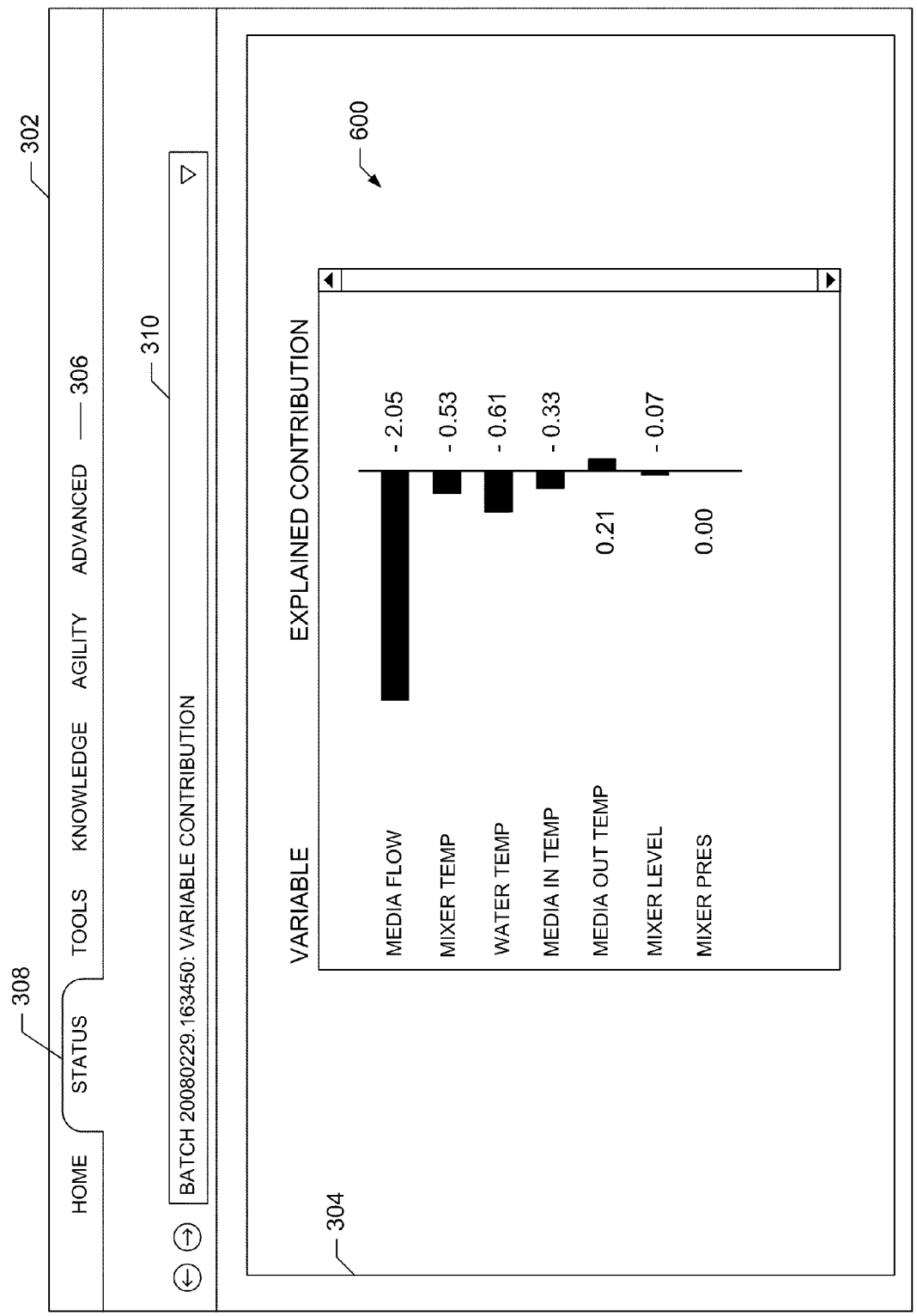
FIG. 6 shows an example data representation of an explained contribution associated with a batch of FIGS. 3-5.

FIG. 6 shows an example data representation 600 of an explained contribution of variables to a variance associated with the batch 20080229.163450 of FIGS. 3-5. In this example, an operator selects the "Batch 20080229.163450 Variable Contribution" process control information by typing the information into the information selection bar 310. The explained variable contribution data representation 600 may show contribution amounts of variables and/or components of a batch process to a variation of the batch from average batch data. Further, the explained contribution may define the contribution of the variables that may be determined from process variation within the batch process.

Upon receiving this process control information, the graphics engine 102 of FIGS. 1 and/or 2 determines process control components associated with the process control information and retrieves the corresponding process data from the data server 104. Further, the example data server 104 determines metadata associated with the retrieved process data. In this example, the data server 104 may determine metadata associated with each variable (e.g., "<Variable Name Media Flow>," "<Variable Name Mixer Temp>," "<Variable Name Water Temp>," etc.). The metadata may also include a format of the process data (e.g., "<Type Decimal>," and/or "<Length 4>").

The example graphics engine 102 may determine that the metadata cross-references to a bar graph data representation type and create an instance of the bar graph data representation type. The graphics engine 102 may use the metadata to link the process data to data fields within the instance to create the data representation 600. The graphics engine 102 then renders the data representation 600 for display within the user interface 302 of FIG. 6.

Figure 7:
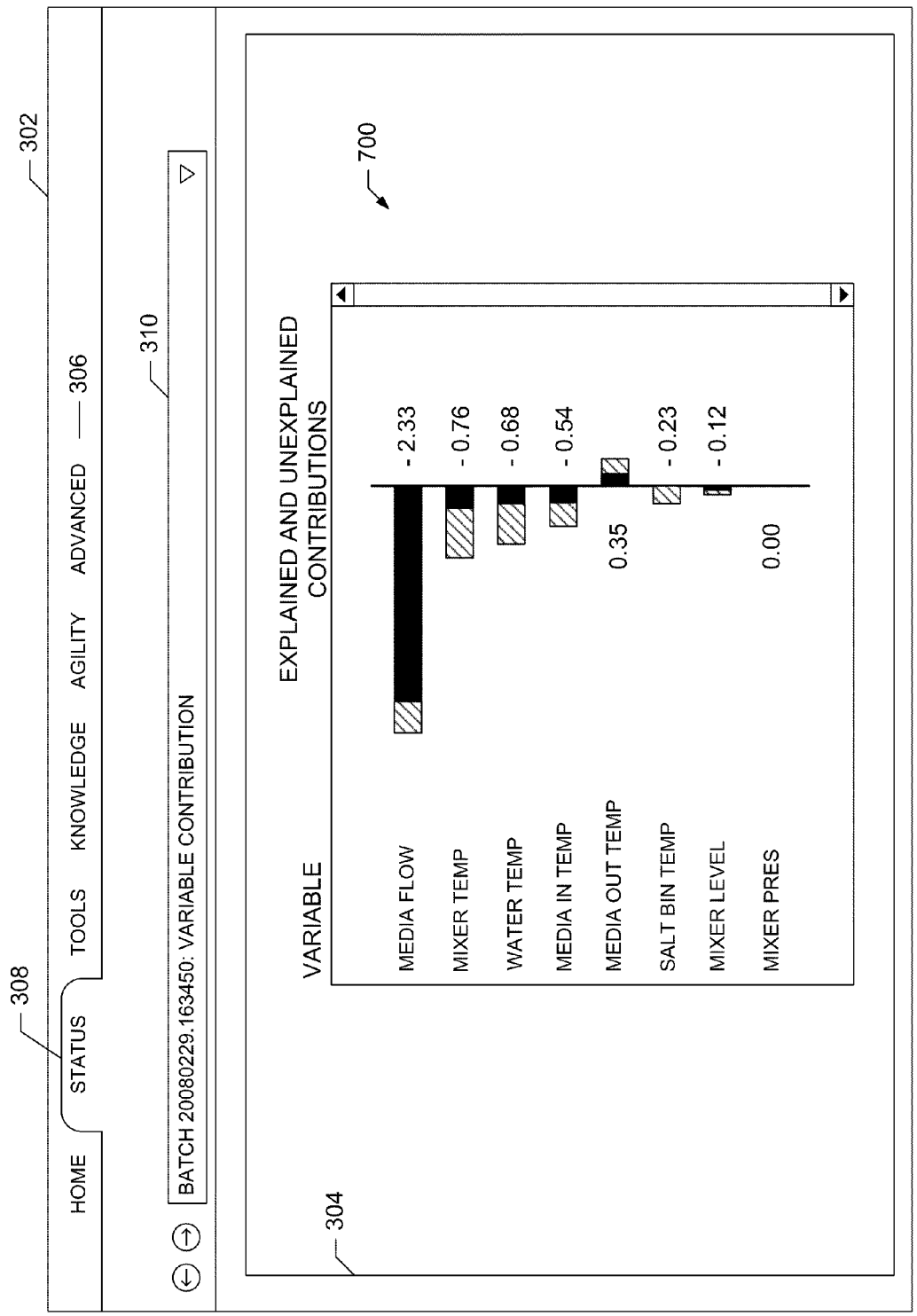
FIG. 7 shows the example data representation of FIG. 6 with an addition of an unexplained contribution associated with the batch of FIGS. 3-5.

FIG. 7 shows the example data representation 600 of FIG. 6 that includes an unexplained contribution associated with the batch of FIGS. 3-5 to create a data representation 700. In this example, an update to an algorithm and/or routine in the controller 108 of FIGS. 1 and/or 2 may redefine and/or add a calculation for unexplained contribution of the batch variables to variance associated with the "Batch 20080229.163450 Variable Contribution" process control information. The unexplained contribution may define the contribution of the variables that cannot be determined from process variations within the batch process.

Upon the graphics engine 102 and/or the data server 104 of FIGS. 1 and/or 2 receiving an indication of an update or modification to the variable contribution calculation, the data server 104 retrieves the process data and/or metadata associated with the "Batch 20080229.163450 Variable Contribution" process control information. The data server 104 may then determine the metadata associated with the process data including metadata identifying the unexplained variable contribution process data. The data server 104 then forwards the metadata and process data to the graphics engine 102. The graphics engine 102 cross-references the metadata and process data to data fields of the data representation 600 of FIG. 6 to determine how the unexplained variable contribution process data is to be displayed. In this example, the graphics engine 102 may determine that the unexplained and explained variable contribution data is to be displayed within a single compound bar for each variable. The graphics engine 102 then links the process data to the appropriate data fields to create the data representation 700 and renders the data representation 700 for display within the user interface 302. In this manner, an update or change to an algorithm or routine in the controller 108 is automatically reflected in the corresponding data representation 700 without an operator having to create a new data representation.

Figure 8:
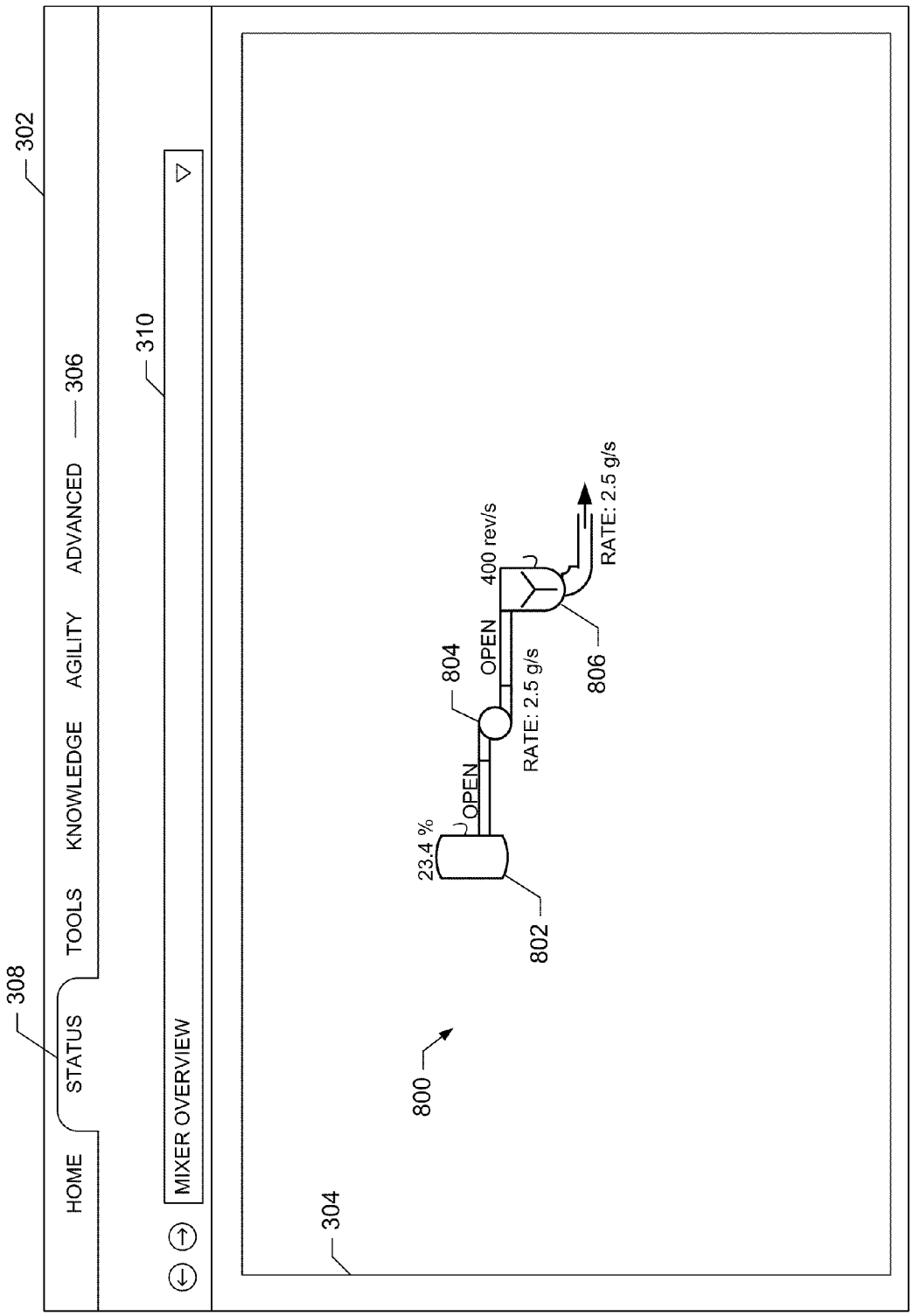
FIG. 8 shows an example data representation of a status of a portion of a process control system.

FIG. 8 shows an example data representation 800 of a status of a portion of a process control system (e.g., a portion of the process control system 106 of FIG. 1). The example data representation 800 shows a tank 802 coupled to a pump 804 that is coupled to a mixer 806. The data representation 800 includes a status of the tank (e.g., 23.4% full), a status of the connection between the tank 802 and the pump 804 (e.g., Open), a status of the pump 804 (e.g., Rate 2.5 g/s), a status of the connection between the pump 804 and the mixer 806 (e.g., Open), a status of the mixer 806 (e.g., 400 rev/s), and a status of the output from the mixer 806 (e.g., Rate 2.5 g/s).

An operator and/or an engineer may create the data representation 800 by entering "Mixer Overview" process control information into the information selection bar 310. The graphics engine 102 of FIGS. 1 and/or 2 then identifies process control components (e.g., the tank 802, the pump 804, and the mixer 806) associated with the selected process control information. The graphics engine 102 then uses these components to retrieve process data associated with these components from the data server 104 and/or the controller of FIGS. 1 and/or 2. Further, the data server 104 determines metadata associated with the retrieved process data.

In the example of FIG. 8, metadata for the tank 802 may include "<Device Tank>," "<Connection Pump>," and/or "<Status Percentage>." Likewise, the metadata for the pump 804 may include "<Device Pump>," "<Connection Tank>," "<Connection Mixer>," and/or "≤Status Rate>." Similarly, the metadata for the mixer 806 may include "<Device Mixer>," "<Connection Pump>," "<Connection Out>," and/or "<Status Revolutions>." The example graphics engine 102 uses this metadata to determine data representation types. For example, the graphics engine 102 may select a tank data representation type based on the metadata for the tank 802, a pump data representation type based on the metadata for the pump 804, and a mixer data representation type based on the metadata for the mixer 806.

The graphics engine 102 may then link the appropriate process data to the data fields for each of the instances of the data representation types for the tank 802, the pump 804, and the mixer 806. The graphics engine 102 may also determine that the "<Connection>" metadata indicates that the data representations for the tank 802, the pump 804, and the mixer 806 are to be combined. The graphics engine 102 then combines the data representations to create the data representation 800. Additionally, the graphics engine 102 renders the data representation 800 for display via the user interface 302.

Figure 9:
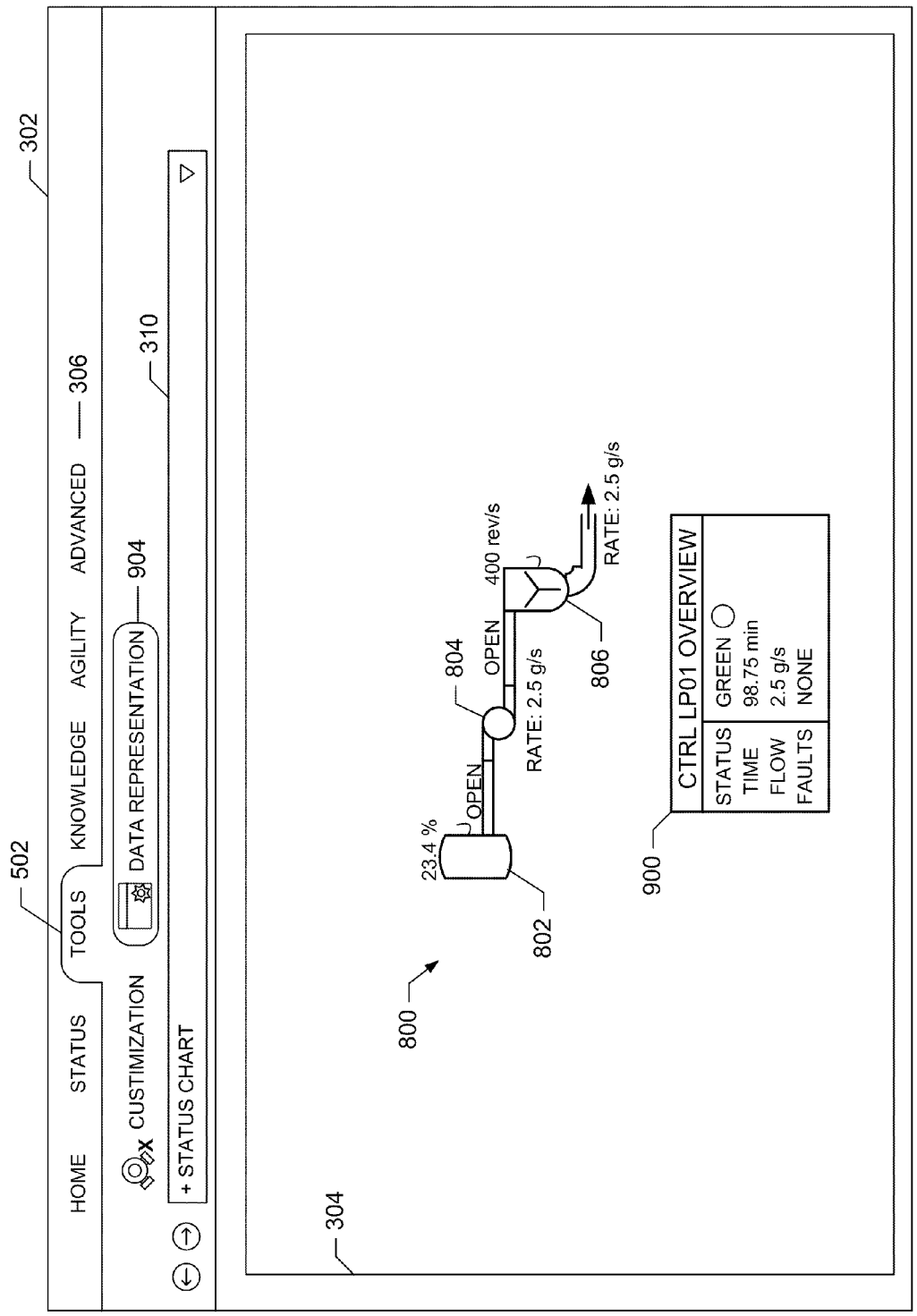
FIG. 9 shows the example data representation of FIG. 8 with an addition of a status chart data representation.

FIG. 9 shows the example data representation 800 of FIG. 8 displayed within the user interface 302 with an addition of a status chart data representation 900. In this example, an operator and/or an engineer may specify an addition of the data representation 900 to provide more process data than would normally be provided by the data representation 800. The operator may add the status chart data representation 900 to the display area 304 by selecting the Tools tab 502 and selecting a data representation icon 904. By selecting the data representation icon 904, the operator may add the data representation 900 to the display area by typing "+Status Chart" in the information selection bar 310.

Upon receiving the "Status Chart" process control information, the example graphics engine 102 of FIGS. 1 and/or 2 determines the process control components associated with the "Status Chart" process control information. The data server 104 then retrieves process data associated with the determined process control components and determines metadata for the retrieved process data. In this example, the metadata for the "Status Chart" may include "<Title CTRL LP01 Overview>," "<Name Status>," "<Name Time>," "<Name Flow>," and "<Name Faults>." The process data may also be associated with metadata specifying data type and/or data length.

The graphics engine 102 then cross-references the determined metadata to a chart data representation type, identifies which process data is associated with which data fields within an instance of the chart data representation type based on the metadata, and links the process data to the data fields to create the data representation 900. Further, the graphics engine 102 renders the data representation 900 for display via the user interface 302. Additionally, the graphics engine 102 may modify the data representation 800 by associating the status chart data representation 900 with the data representation 800 and storing this association within the data representation database 218. In this manner, if the operator at a later time selects to view the data representation 800, the status chart data representation 900 is also displayed via the user interface 302 without the operator explicitly having to specify to view the status chart data representation 900.

FIGS. 10, 11A, 11B, and 12 are flowcharts of example methods that may be carried out to implement the example selection receiver 202, the example data manager 204, the example data retriever 206, the example metadata generator 208, the example metadata type database 210, the example metadata parser 212, the example data representation generator 214, the example metadata rules database 216, the example data representation database 218, the example data representation display manager 220, and/or more generally, the graphics engine 102 and/or the data server 104 of FIGS. 1 and/or 2. The example methods of FIGS. 10, 11A, 11B, and/or 12 may be carried out by a processor, a controller and/or any other suitable processing device. For example, the example methods of FIGS. 10, 11A, 11B, and/or 12 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 13). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 10, 11A, 11B, and/or 12 may be implemented using any combination(s) of ASIC(s), PLD(s), FPLD(s), discrete logic, hardware, firmware, etc.

Figure 10:
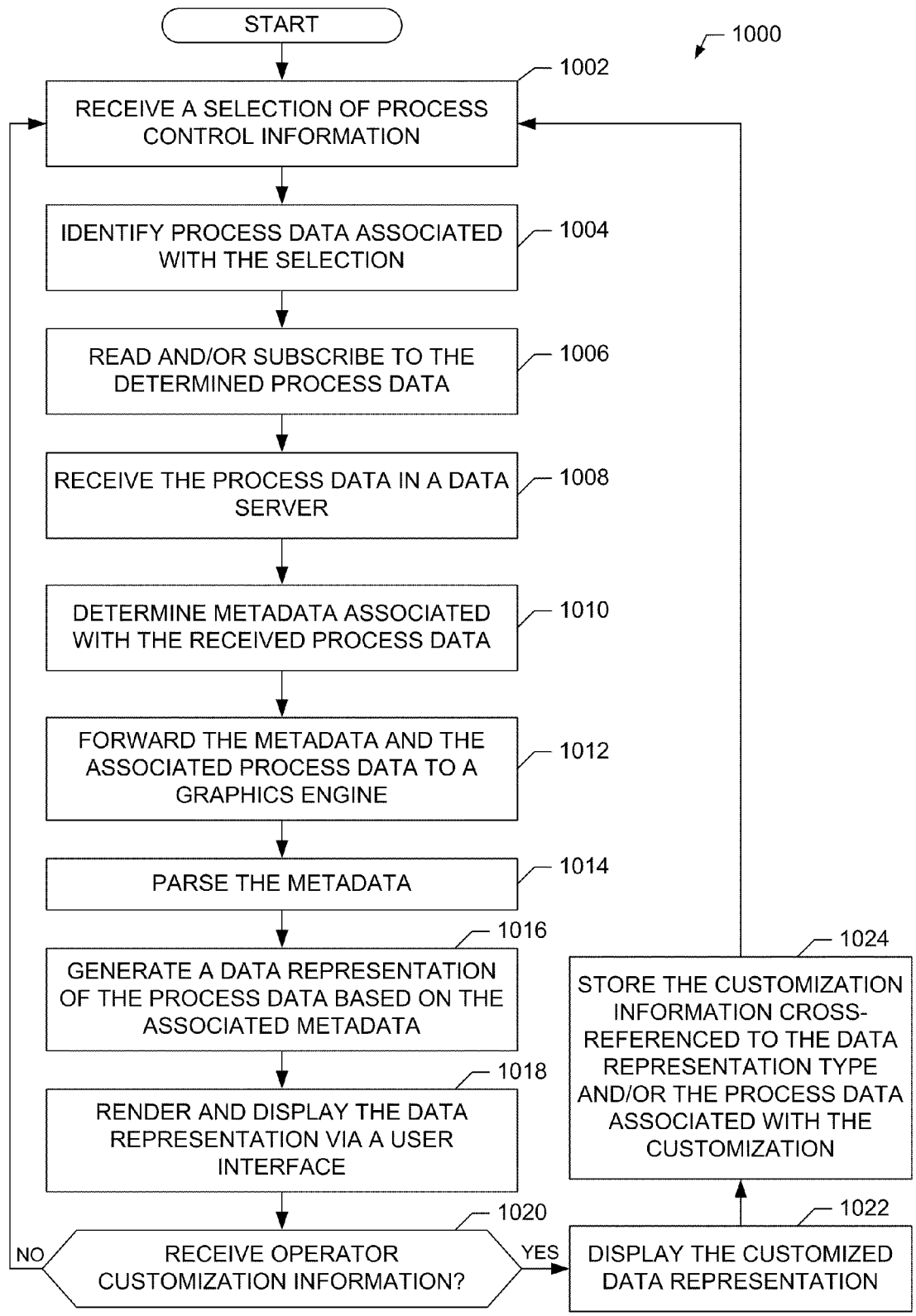
FIGS. 10, 11A, 11B, and 12 are flowcharts of example methods that may be used to implement the example graphics engine, the example data server, an example selection receiver, an example data manager, an example metadata parser, an example data representation generator, an example data representation display manager, an example data retriever, and/or an example metadata generator of FIGS. 1 and/or 2.
Figure 11A:
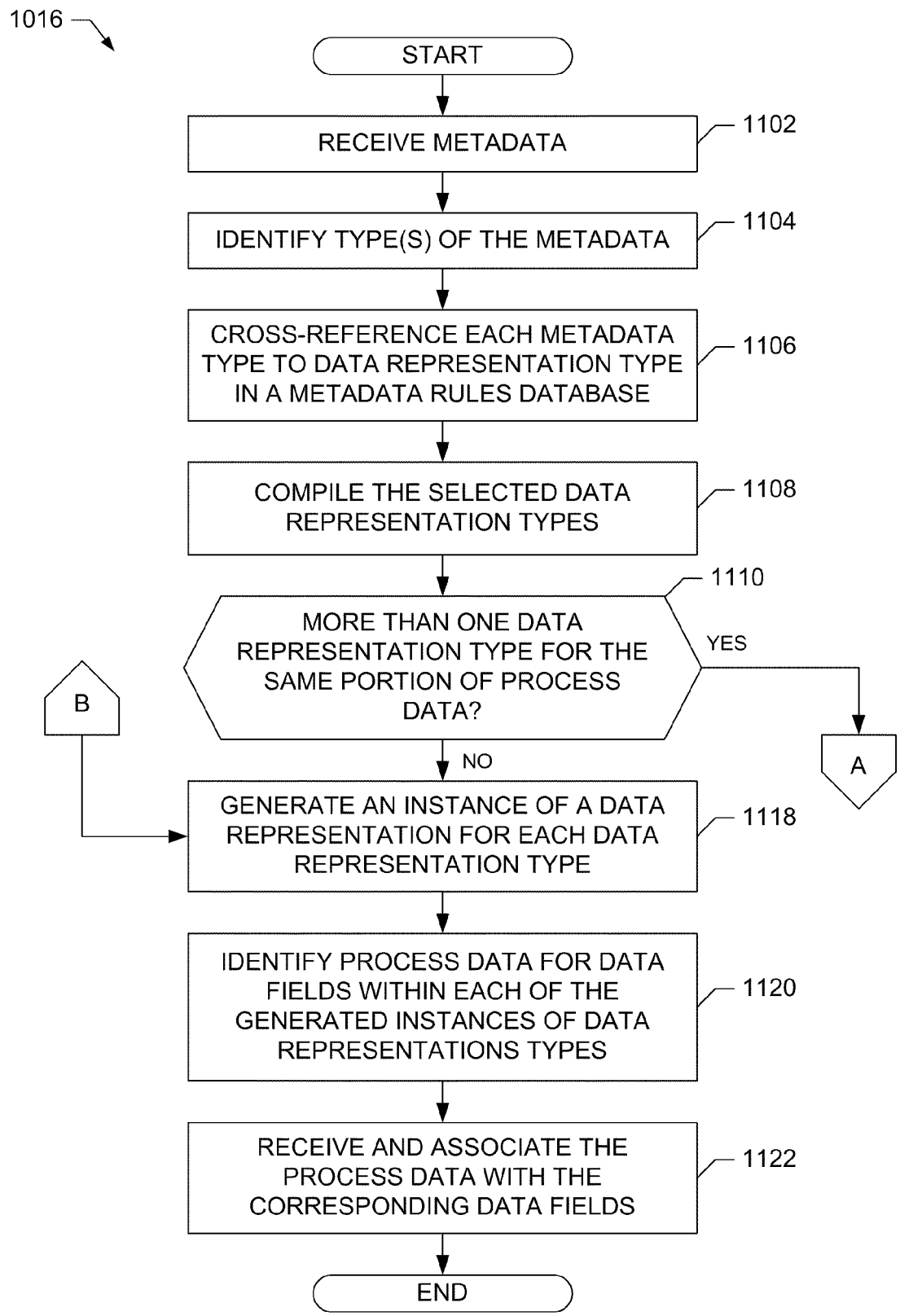
Figure 11B:
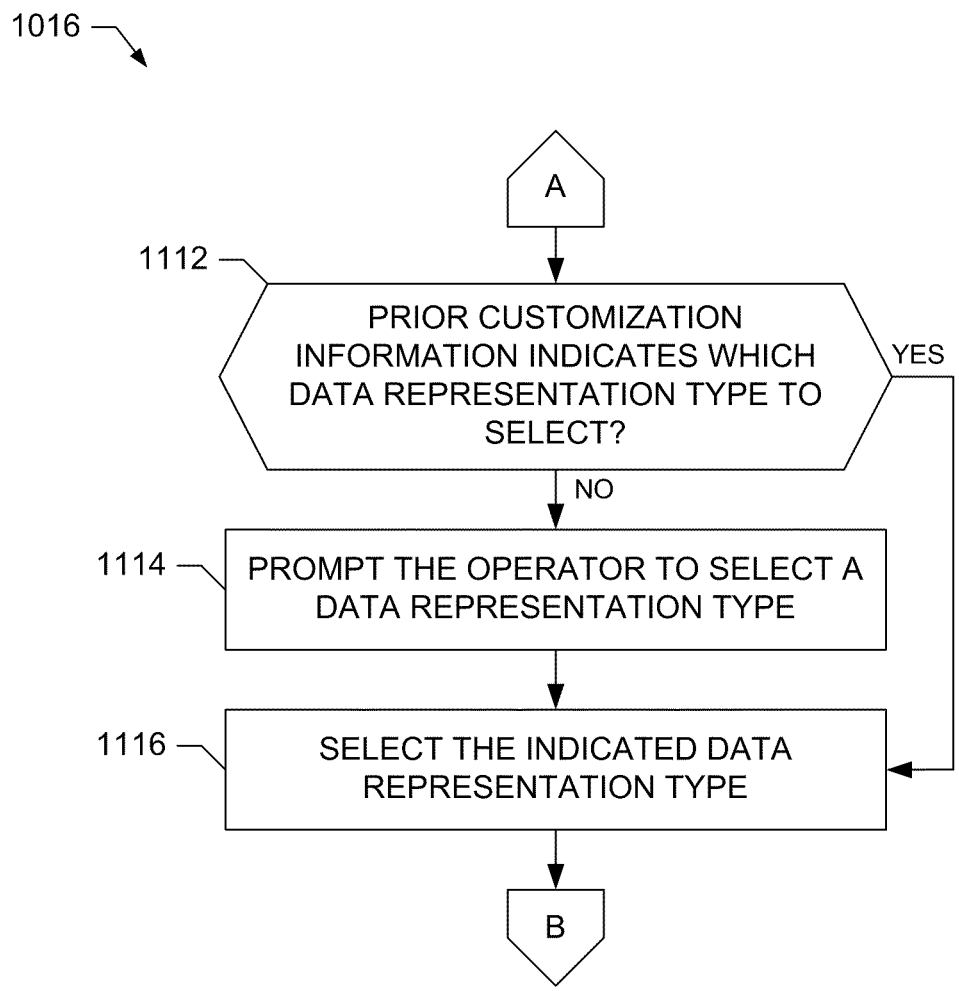

Also, some or all of the example methods of FIGS. 10, 11A, 11B, and/or 12 may instead be implemented using manual operations or as any combination of any of the foregoing techniques, for example, any combination of firmware, software, discrete logic and/or hardware. Furthermore, many other methods of implementing the example operations of FIGS. 10, 11A, 11B, and/or 12 may be employed. For example, the order of execution of the blocks may be changed, and/or one or more of the blocks described may be changed, eliminated, sub-divided, or combined. Additionally, any or all of the example methods of FIGS. 10, 11A, 11B, and/or 12 may be carried out sequentially and/or carried out in parallel by, for example, separate processing threads, processors, devices, discrete logic, circuits, etc.

The example method 1000 of FIG. 10 generates a dynamic data representation based on selected process control information. Multiple example methods 1000 may be executed in parallel or series to generate multiple data representations. Additionally, in examples where multiple uses select process control information, an example method 1000 may be implemented for each user or, alternatively, a single example method 1000 may be implemented for all of the users.

The example method 1000 of FIG. 10 begins by receiving a selection of process control information (e.g., via the selection receiver 202 of FIG. 2) from a user (block 1002). The example method 1000 identifies process data (e.g., via the data manager 204) associated with the selected process control information (block 1004). The process data may be determined and/or identified from process control components that may be associated with the process control information. Next, the example method 1000 reads and/or subscribes (e.g., via the data retriever 206) to the determined process data (block 1006). The example method 1000 then receives the process data in the data server 104 (block 1008).

The example method 1000 of FIG. 10 continues by determining (e.g., via the metadata generator 208) metadata associated with the received process data (block 1010). The example method 1000 may determine metadata that may be associated with and/or embedded within the process data or, alternatively, the example method 1000 may create and/or generate metadata based on a type and/or format of the process data. The example method 1000 then forwards the metadata and the associated process data to the graphics engine 102 (block 1012). Next, the example method 1000 parses (e.g., via the metadata parser 212) the metadata (block 1014). In other examples where the graphics engine 102 is included within the data server 104, the example method 1000 may parse the metadata upon determining the metadata.

Upon parsing the metadata, the example method 1000 generates a data representation (e.g., via the data representation generator 214) to display the process data based on the associated metadata (block 1016). The example method 1000 may generate data representation(s) for each group and/or portion of the metadata and/or the process data that is to be displayed. A more detailed description regarding how the example method 1000 generates the data representation(s) is described below in conjunction within FIGS. 11A and 11B. After generating the data representation(s), the example method 1000 renders (e.g., via the data representation display manager 220) and displays the data representation(s) (e.g., via the UI presentation processor 124) via a user interface (block 1018).

The example method 1000 then determines if a user has customized any of the displayed data representations (block 1020). The example method 1000 may determine if a user has customized a data representation by receiving customization information from the UI presentation processor 124 and/or by polling the data interfaces to determine if any data representations have been changed and/or modified. If the example method 1000 determines that a user has not customized at least one data representation, the example method 1000 returns to receiving a selection of process control information from either the same user and/or a different user at another workstation (block 1002).

However, if the example method 1000 determines that the user has customized at least one data representation (block 1020), the example method 1000 displays the data representation based on the customization information (block 1022). Additionally, the example method 1000 (e.g., via the data representation generator 214) stores the customization information with the associated data representation, the data representation type, and/or the process data in the data representation database 218 (block 1024). The example method 1000 may then return to receiving a selection of process control information from either the same user and/or a different user at another workstation (block 1002).

The example method 1016 of FIGS. 11A and 11B generates a data representation based on received metadata as described in FIG. 10. The example method 1016 may be implemented and/or executed by the data representation generator 214 of FIG. 2. Multiple example methods 1016 may be executed in parallel or series to generate multiple data representations. Additionally, in examples where multiple portions of metadata are received, an example method 1016 may be implemented for each portion or, alternatively, a single example method 1016 may be implemented for all of the portions.

The example method 1016 of FIG. 11A begins be receiving metadata (block 1102). The metadata may be sent from the metadata parser 212 of FIG. 2. Next, the example method 1016 identifies type(s) of the received metadata (block 1104). The type(s) of metadata may be identified by metadata identifiers, code words, and/or symbols included within the metadata. The example method 1016 then cross-references each metadata type to a data representation type in the metadata rules database 216 of FIG. 2 (block 1106). In examples where multiple metadata types are associated with a portion of process data specified to be displayed within a single data representation, the example method 1016 may select a data representation type that matches and/or cross-references to the multiple metadata types.

The example method 1016 of FIG. 11A then compiles the matched data representation types (block 1108) and determines if there is more than one data representation type associated with the same portion of process data (block 1110). If there is more than one possible data representation type for the process data, the example method 1016 of FIG. 11B accesses the data representation database 218 and determines if there is prior customization information that indicates which data representation type should be selected (block 1112). If there is no prior customization information and/or no other information that may specify which data representation type to select, the example method 1016 prompts the user (e.g., the operator or engineer) to select one of the data representation types (block 1114). The example method 1016 then selects the indicated data representation type (block 1116). However, if there is prior customization information (block 1112), the example method 1016 automatically selects the indicated data representation type (block 1116). Alternatively, in other examples, the example method 1016 may select all matching data representation types.

The example method 1016 of FIG. 11A continues by generating an instance of a data representation for each selected data representation type (block 1118). Additionally, if the example method 1016 determines there is only one data representation type for the process data (block 1110), the example method 1016 generates an instance of the data representation for the data representation type (block 1118). Next, the example method 1016 identifies process data for data fields within each of the instances of the generated data representation types (block 1120). Identifying process data may include determining which process data is associated with the metadata matched to the data representation. Additionally, identifying the process data may include determining which process data is associated with each data field. The example method 1016 then receives the process data and associates the process data with the corresponding data fields in the instance of data representation type to create the data representation. Associating the process data may include linking the process data by inserting the process data into the data fields and/or inserting locations of the process data into the appropriate data fields. Upon generating the data representation(s), the example method 1016 ends.

The example method 1200 of FIG. 1 dynamically updates a data representation based on changes to metadata and/or process data. Multiple example methods 1200 may be executed in parallel or series to update multiple data representations. Additionally, in examples where multiple uses modify metadata and/or process data, an example method 1200 may be implemented for each user or, alternatively, a single example method 1200 may be implemented for all of the users.

Figure 12:
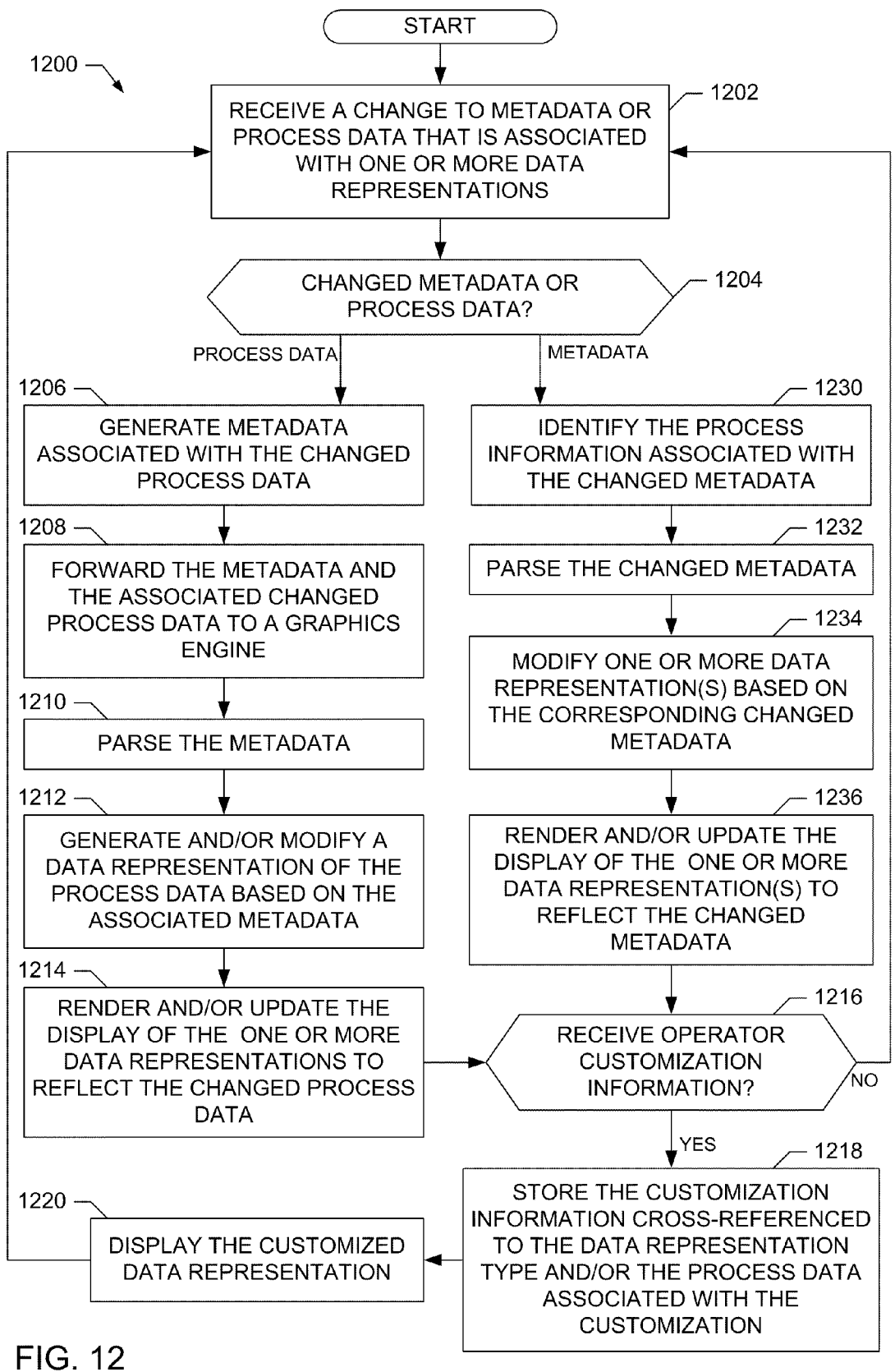

The example method 1200 of FIG. 12 begins by receiving a change to metadata and/or process data (e.g., via the data representation display manager 220) that is associated with one or more data representations that are displayed via a user interface (block 1202). The changed metadata and/or process data may result from a change to field devices, a controller, a routine, and/or a process control system. In the example of FIG. 12, an indication of the changed metadata and/or process data may be transmitted by the controller 108 of FIGS. 1 and 2. Alternatively, a user may change process data and/or metadata by modifying a displayed data representation and/or by changing a definition of metadata and/or the process data. In this example, the indication of the changed metadata and/or process data may be sent by the UI presentation processor 124. In other examples, the example method 1200 may poll the controller 108 and/or the UI presentation processor 124 for changes to metadata and/or process data that may affect a data representation.

The example method 1200 of FIG. 12 then determines if the change occurred to metadata or process data (block 1204). If the change occurred to process data, the example method 1200 generates metadata (e.g., via the metadata generator 208 and/or the data representation generator 214) associated with the changed process data (block 1206). Next, the example method 1200 forwards the newly generated metadata and the changed process data to the graphics engine 102 to update the affected data representation (block 1208). The example method 1200 may also parse the metadata (block 1210).

Upon parsing the metadata, the example method 1200 generates and/or modifies data representation(s) associated with the changed process data based on the associated metadata (block 1214). The example method 1200 identifies the data representation(s) by matching the changed process data to already generated data representations. After modifying the data representation(s), the example method 1200 renders and/or updates the data representation(s) and displays the data representation(s) via a user interface (block 1214).

The example method 1200 then determines if a user has customized any of the modified data representation(s) (block 1216). If the example method 1200 determines that a user has not customized at least one modified data representation, the example method 1200 returns to receiving a selection of a change to metadata and/or process data from either the same user and/or a different user at another workstation (block 1202).

However, if the example method 1200 determines that the user has customized at least one data representation (block 1216), the example method 1200 stores the customization information with the associated data representation(s), the data representation type, and/or the process data in the data representation database 218 (block 1218). Additionally, the example method 1200 displays customized and/or modified the data representation(s) (block 1220). The example method 1200 may then return to receiving a selection of a change to metadata and/or process data from either the same user and/or a different user at another workstation (block 1202).

If the example method 1200 determines that a change occurred to metadata (block 1204), the example method identifies process control information and/or components associated with the changed metadata (block 1230). The example method 1200 may also parse the changed metadata (block 1232). Next, the example method 1200 identifies and modifies one or more data representation(s) based on the corresponding changed metadata (block 1234). The example method 1200 then renders and/or updates the display of the one or more modified data representation(s) (block 1236). The example method 1200 next determines if a user has customized any of the modified data representation(s) (block 1216). If the example method 1200 determines that a user has not customized at least one modified data representation, the example method 1200 returns to receiving a selection of a change to metadata and/or process data from either the same user and/or a different user at another workstation (block 1202).

However, if the example method 1200 determines that the user has customized at least one data representation (block 1216), the example method 1200 stores the customization information with the associated data representation(s), the data representation type, and/or the process data in the data representation database 218 (block 1218). Additionally, the example method 1200 displays customized and/or modified the data representation(s) (block 1220). The example method 1200 may then return to receiving a selection of a change to metadata and/or process data from either the same user and/or a different user at another workstation (block 1202).

Figure 13:
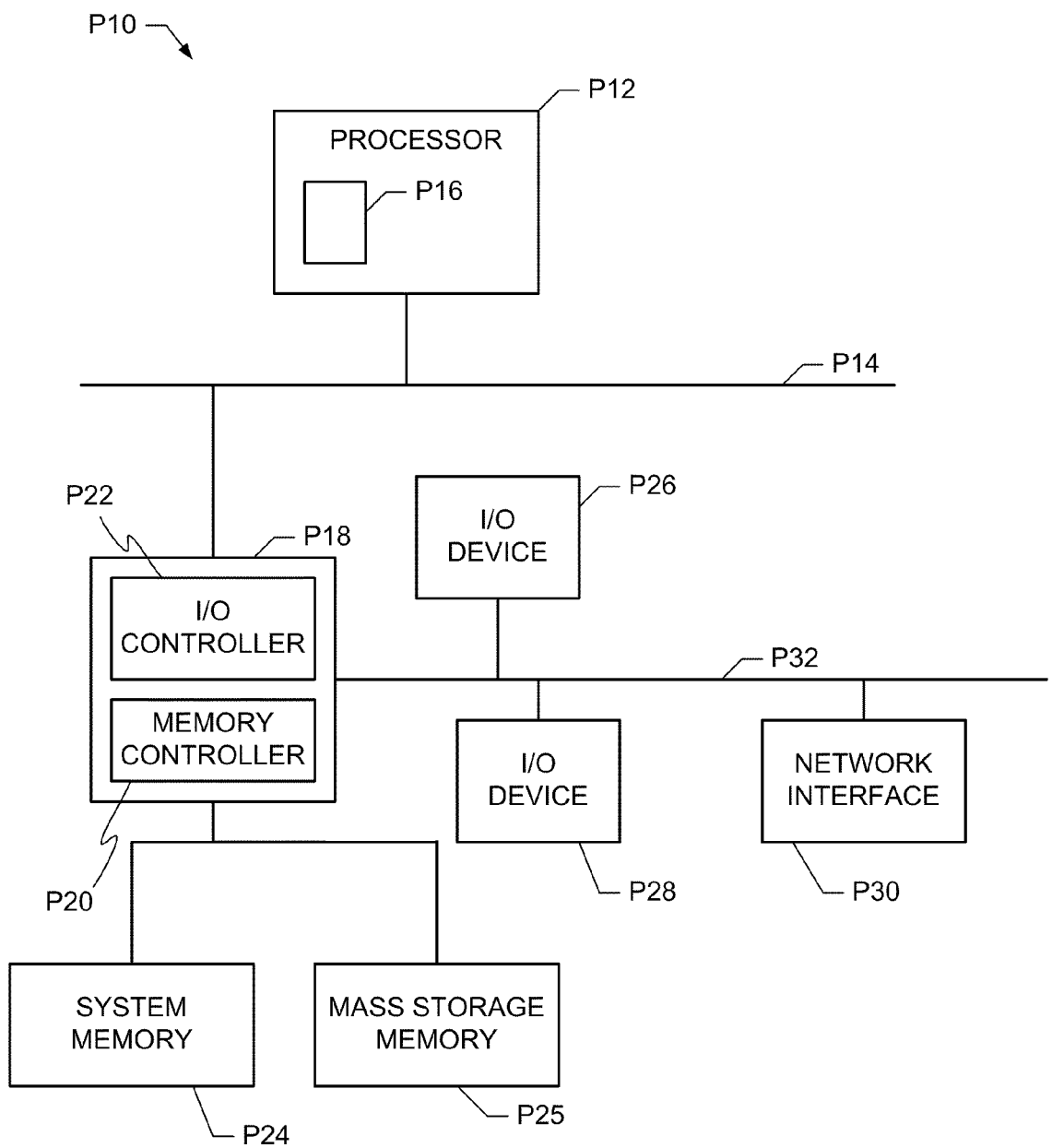
FIG. 13 is a block diagram of an example processor system that may be used to implement the example methods and apparatus described herein.

FIG. 13 is a block diagram of an example processor system P10 that may be used to implement the example methods and apparatus described herein. For example, processor systems similar or identical to the example processor system P10 may be used to implement the example selection receiver 202, the example data manager 204, the example data retriever 206, the example metadata generator 208, the example metadata type database 210, the example metadata parser 212, the example data representation generator 214, the example metadata rules database 216, the example data representation database 218, the example data representation display manager 220, and/or more generally, the graphics engine 102 and/or the data server 104 of FIGS. 1 and/or 2. Although the example processor system P10 is described below as including a plurality of peripherals, interfaces, chips, memories, etc., one or more of those elements may be omitted from other example processor systems used to implement one or more of the example selection receiver 202, the example data manager 204, the example data retriever 206, the example metadata generator 208, the example metadata type database 210, the example metadata parser 212, the example data representation generator 214, the example metadata rules database 216, the example data representation database 218, the example data representation display manager 220, and/or more generally, the graphics engine 102 and/or the data server 104.

As shown in FIG. 13, the processor system P10 includes a processor P12 that is coupled to an interconnection bus P14. The processor P12 includes a register set or register space P16, which is depicted in FIG. 13 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 13, the system P10 may be a multi-processor system and, thus, may include one or more additional processors that are identical or similar to the processor P12 and that are communicatively coupled to the interconnection bus P14.

The processor P12 of FIG. 13 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the graphics engine 102 and/or the data server 104 (FIG. 2), the mass storage memory P25 may include a hard disk drive, an optical drive, a tape storage device, etc. Alternatively, if the example processor system P10 is used to implement the example metadata type database 210, the example metadata rules database 216, and/or the example data representation database 218, the mass storage memory P25 may include a solid-state memory (e.g., a flash memory, a RAM memory, etc.), a magnetic memory (e.g., a hard drive), or any other memory suitable for mass storage in the example metadata type database 210, the example metadata rules database 216, and/or the example data representation database 218.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 13 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to dynamically display data associated with a process control system, the method comprising:
   receiving in a graphics engine, process control information selected by a user;
   identifying first process data associated with the selected process control information;
   retrieving the first process data from a process controller;
   generating first metadata for a data representation of the first process data by cross-referencing the retrieved first process data to a metadata type in a metadata type database;
   determining first icon connection information representative of a configuration of the process control system based on the first metadata;
   parsing the first metadata by first metadata identifiers in the first metadata, the first metadata identifiers indicating (1) a first icon representative of a first field device associated with the process control information, (2) a second icon representative of a second field device associated with the process control information, and (3) the first icon connection information is associated with the first and the second icons;
   generating in the graphics engine the data representation based on the first metadata identifiers by cross-referencing the first metadata identifiers to corresponding data representation types in a metadata rules database;
   displaying the data representation of the first process data via a user interface;
   identifying second process data associated with a change in the process control system, the change being at least one of adding a field device to the process control system or removing one of the field devices from the process control system; and
   in response to the at least one of adding the field device to the process control system or removing one of the field devices from the process control system, automatically modifying the displayed data representation of the first process data by incorporating the second process data into the displayed data representation.

2. A method as defined in claim 1, wherein incorporating the second process data into the displayed data representation includes at least one of adding a second data representation to be displayed via the user interface, adding a parameter to the data representation, removing a parameter from the data representation, modifying a parameter type of the data representation, or altering the data representation type.

3. A method as defined in claim 1, further comprising prompting the user to select a data representation type prior to cross-referencing the first metadata identifiers to the corresponding data representation types.

4. A method as defined in claim 1, further comprising rendering the data representation prior to displaying the data representation.

5. A method as defined in claim 1, wherein generating the first metadata includes identifying metadata associated with the first process data.

6. A method as defined in claim 1, wherein the selected process control information is identified by at least one of a batch identifier, a process identifier, a controller identifier, a field device identifier, a file associated with the first process data, a link to the first process data, one or more functional blocks, one or more parameters, one or more process control endpoints, or a process control routine.

7. A method as defined in claim 1, wherein retrieving the first process data includes at least one of subscribing to or reading the first process data.

8. A method as defined in claim 1, wherein parsing the first metadata by metadata identifiers occurs prior to generating the data representation.

9. A method as defined in claim 1, further comprising:
   receiving customization information associated with the data representation;
   referencing the customization information to the data representation;
   modifying the data representation based on the customization information;
   displaying the modified data representation via the user interface; and
   storing the referencing of the customization information associated with the data representation to a database.

10. A method as defined in claim 9, wherein the customization information includes at least one of a modification of a display of the data representation, a change in color of the data representation, a change in layout of one or more data representations, a change in graphics associated with the data representation, a change in display format of the data representation, or a change in identification associated with the data representation.

11. A method as defined in claim 1, further comprising:
generating in the graphics engine status data associated with the data representation based on the first metadata; and
displaying the status data associated with the data representation and the data representation via the user interface.

12. An apparatus to dynamically display data associated with a process control system, the apparatus comprising:
a data manager to:
identify first process data associated with selected process control information; and
identify second process data associated with a first change to the process control system, the first change being at least one of adding a field device to the process control system or removing a field device from the process control system;
a metadata generator located within a data server to determine first icon connection information representative of a configuration of the process control system based on a source of the first process data and first metadata, comprising first metadata identifiers, associated with the first process data by cross-referencing the first process data to a metadata type in a metadata type database, wherein the data server further includes the metadata type database, and the first metadata identifiers indicating (1) a first icon representative of a first field device associated with the process control information, (2) a second icon representative of a second field device associated with the process control information, and (3) the first icon connection information is associated with the first and the second icons;
a data representation generator to generate a data representation based on the first metadata and cross-referencing the first metadata to a corresponding data representation type in a metadata rules database;
a metadata parser to parse the first metadata by the first metadata identifiers prior to the data representation generator generating the data representation; and
a data representation display manager to:
display the data representation of the first process data via a user interface; and
in response to the at least one of adding the field device to the process control system or removing the field device from the process control system, modify the displayed data representation of the first process data by incorporating the second process data into the displayed data representation;
wherein at least one of the data manager, the metadata generator, the data representation generator, or the data representation display manager comprises a processor.

13. An apparatus as defined in claim 12, further comprising:
a selection receiver to receive the selected process control information; and
a data retriever to retrieve the first process data from a process controller and to forward the first process data to the data manager.

14. An apparatus as defined in claim 13, wherein at least one of the data manager, the selection receiver, the data representation display manager, or the data representation generator is included within a graphics engine.

15. An apparatus as defined in claim 13, wherein the data retriever is included within the data server.

16. An apparatus as defined in claim 15, wherein the data server is included within a graphics engine.

17. An apparatus as defined in claim 12, wherein the data representation display manager is to render the data representation prior to displaying the data representation.

18. An apparatus as defined in claim 12, wherein the metadata generator is to determine the first metadata by cross-referencing in a metadata type database the first process data to a type of metadata.

19. An apparatus as defined in claim 12, wherein the metadata generator is to determine the first metadata by identifying metadata associated with the first process data.

20. An apparatus as defined in claim 12, wherein the data manager is to identify the selected process control information by at least one of a batch identifier, a process identifier, a controller identifier, a field device identifier, a file associated with the first process data, a link to the first process data, one or more functional blocks, one or more parameters, one or more process control endpoints, or a process control routine.

21. An apparatus as defined in claim 12, wherein:
the data representation display manager is to receive customization information associated with the data representation; and
the data representation generator is to:
reference the customization information to the data representation;
modify the data representation based on the customization information; and
store the referencing of the customization information to the data representation to a data representation database.

22. A tangible machine readable storage disk or storage device having instructions stored thereon that, when executed, cause a machine to:
receive process control information selected by a user;
identify first process data associated with the selected process control information, the first process data being associated with a first change in the process control system, the first change associated with at least one of adding a field device to the process control system or removing a field device from the process control system;
retrieve the first process data from a process controller;
determine first icon connection information representative of a configuration of the process control system based on a source of the process control data;
generate first metadata, comprising first metadata identifiers, for a data representation of the first process data by cross-referencing the first process data to a metadata type in a metadata type database, the first metadata identifiers indicating (1) a first icon representative of a first field device associated with the process control information, (2) a second icon representative of a second field device associated with the process control information, and (3) the first icon connection information is associated with the first and the second icons;
generate the data representation based on the first metadata and cross-referencing the first metadata to a corresponding data representation type in a metadata rules database by generating an instance of the data representation type associated with the metadata type and associating the first process data to data representation type;
display the data representation of the first process data via a user interface;
identify second process data associated with a second change in the process control system, the second change associated with a change to at least one of the first process data or the first metadata; and in response to the second change, modify the displayed data representation of the first process data by incorporating the second process data into the displayed data representation.

23. An apparatus to dynamically display data associated with a process control system, the apparatus comprising:
one or more processors that, when operative, cause the apparatus to:
receive process control information selected by a user;
identify first process data associated with the selected process control information;
retrieve the first process data from a process controller;
determine first icon connection information representative of a configuration of the process control system based on a source of the first process data;
determine, when metadata comprising metadata identifiers for a data representation of the first process data is not retrieved with the first process data, a metadata type associated with the first process data by cross-referencing the first process data to the metadata type in a metadata type database, the first metadata identifiers indicating (1) a first icon representative of a first field device associated with the process control information, (2) a second icon representative of a second field device associated with the process control information, and (3) the first icon connection information is associated with the first and the second icons;
generate first metadata corresponding to the metadata type;
generate the data representation by using the first metadata corresponding to the metadata type and by cross-referencing the first metadata to a corresponding data representation type;
display the data representation of the first process data via a user interface;
identify second process data associated with a first change in the process control system, the first change being at least one of adding a field device to the process control system or removing a field device from the process control system;
identify the data representation associated with a status the first process data and
in response to at least one of adding the field device to the process control system or removing the field device from the process control system, link a status of a second process data to the data representation associated with the status of the first process data.

24. An apparatus as defined in claim 23, wherein the one or more processors, when operative, cause the apparatus to:
receive a second change, the second change associated with a change to at least one of the first process data or the first metadata;
in response to receiving the second change, modify the data representation based on the second change; and
display the modified data representation via the user interface.

25. An apparatus as defined in claim 23, wherein the one or more processors, when operative, cause the apparatus to:
generate an instance of the corresponding data representation type;
associate the first metadata with a data field in the instance of the data representation type; and
associate the first process data associated with the first metadata with the data field in the instance of the data representation type to generate the data representation.

26. An apparatus as defined in claim 23, wherein the one or more processors, when operative, cause the apparatus to:
identify the first process data via a message or data word; and
determine the metadata type when the message or the data word includes insufficient metadata or does not include any metadata.

27. An apparatus as defined in claim 23, wherein, to identify the second process data, the one or more processors further cause the apparatus to:
identify the second process data is associated with a second process that was not previously associated with the process control information;
identify second metadata associated with the second process data; and
retrieve at least one of the second process data or the second metadata associated with the second process.

28. An apparatus as defined in claim 12, wherein:
a graphics engine is to detect a second change, the second change associated with a change to the at least one of the first process data or the first metadata by polling a data server:
the data representation generator is to modify the data representation based on the second change; and
the data representation display manager is to display the modified data representation based on the second change via the user interface.

29. A method as defined in claim 1, wherein the first metadata identifiers indicate a type, a chart type, a table type, or an icon representative of a field device associated with the first process data.

30. A tangible machine readable storage disk or storage device as defined in claim 22, wherein the instructions, when executed, further cause the machine to generate the first metadata by identifying metadata associated with the first process data.

31. A tangible machine readable storage disk or storage device as defined in claim 22, wherein the instructions, when executed, cause the machine to:
receive customization information associated with the data representation;
reference the customization information to the data representation;
modify the data representation based on the customization information;
display the modified data representation via the user interface; and
store the referenced customization information to the data representation to a database.

32. A tangible machine readable storage disk or storage device as defined in claim 22, wherein the instructions, when executed, cause the machine to:
generate a second data representation based on the first metadata; and
display the second data representation via the user interface.

33. A tangible machine readable storage disk or storage device as defined in claim 22, wherein the instructions, when executed, cause the machine to generate the first metadata when insufficient metadata is retrieved with the first process data from the process controller.

34. A tangible machine readable storage disk or storage device as defined in claim 22, wherein the instructions, when executed, cause the machine to parse the first metadata by first metadata identifiers in the first metadata, the first metadata identifiers indicating respective types of data representations for respective parsed portions of the first metadata.

35. An apparatus as defined in claim 12, wherein the first metadata identifiers indicate a graph type, a chart type, a table type, or an icon representative of a field device associated with the first process data.

36. A tangible machine readable storage disk or storage device as defined in claim 22, wherein the first metadata identifiers indicate a graph type, a chart type, a table type, or an icon representative of a field device associated with the first process data.

37. A method as defined in claim 1, further including:
generating second metadata for the second process data by cross-referencing the second process data to a metadata type in the metadata type database;
determining second icon connection information representative of a modified configuration of the process control system based on the second metadata;
parsing the second metadata by second metadata identifiers in the second metadata, the second metadata identifiers indicating (1) the first icon representative of the first field device associated with the process control information, (2) the second icon representative of the second field device associated with the process control information, in response to adding the device, (3) a third icon representative of the added device type associated with the process control information, and (4) the second icon connection information is associated with at least one of the first, second, or third icons;
generating in the graphics engine the data representation based on the second metadata identifiers by cross-referencing the second metadata identifiers to corresponding data representation types in the metadata rules database.

38. An apparatus as defined in claim 12, wherein:
the metadata generator is to:
generate second metadata for the second process data by cross-referencing the second process data to a metadata type in the metadata type database; and
determine second icon connection information representative of a modified configuration of the process control system based on the second metadata;
in response to adding the device to the process control system, the second metadata identifiers to further indicate a third icon representative of a device type of the added device associated with the process control information and the second icon connection information is associated with at least one of the first, second, or third icons; and
the data representation generator is to generate in the graphics engine the data representation based on the second metadata identifiers by cross-referencing the second metadata identifiers to corresponding data representation types in the metadata rules database.

39. A tangible machine readable storage disk or storage device as defined in claim 22, wherein the instructions, when executed, cause the machine to:
generate second metadata for the second process data by cross-referencing the second process data to a metadata type in the metadata type database;
determine second icon connection information representative of a modified configuration of the process control system based on the second metadata;
in response to the adding of a device to the process control system, identify by the first metadata identifier a third icon representative of a third field device associated with the process control information, and the second icon connection information is associated with at least one of the first, second, or third icons; and
generate in the graphics engine the data representation based on the second metadata by cross-referencing second metadata identifiers to corresponding data representation types in the metadata rules database.

40. An apparatus as defined in claim 28, wherein:
modifying the displayed data representation of the first process data by incorporating the second process data into the displayed data representation includes at least one of adding a field device to the displayed data representation or removing a field device from the displayed data representation; and
modifying the data representation based on the second change includes adding to the process control information, new process data associated with the first process data that was not previously associated with the process control information.

* * * * *